United States Patent
Cheng et al.

(10) Patent No.: US 8,270,384 B2
(45) Date of Patent: Sep. 18, 2012

(54) WIRELESS POINT THAT PROVIDES FUNCTIONS FOR A WIRELESS LOCAL AREA NETWORK TO BE SEPARATED BETWEEN THE WIRELESS POINT AND ONE OR MORE CONTROL NODES, AND METHOD FOR PROVIDING SERVICE IN A WIRELESS LOCAL AREA NETWORK HAVING FUNCTIONS SEPARATED BETWEEN A WIRELESS POINT AND ONE OR MORE CONTROL NODES

(75) Inventors: Hong Cheng, Singapore (SG); Pek Yew Tan, Singapore (SG); Saravanan Govindan, Singapore (SG)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/235,912

(22) Filed: Sep. 19, 2011

(65) Prior Publication Data

US 2012/0005354 A1 Jan. 5, 2012

Related U.S. Application Data

(62) Division of application No. 10/591,184, filed as application No. PCT/JP2005/003390 on Mar. 1, 2005, now Pat. No. 8,045,531.

(30) Foreign Application Priority Data

Mar. 2, 2004 (JP) .................... 2004-058245
Jul. 16, 2004 (JP) .................... 2004-209470

(51) Int. Cl.
*H04W 4/00* (2009.01)
(52) U.S. Cl. ..... 370/338; 370/252; 370/254; 370/310.2; 370/328; 455/41.2; 455/434; 455/435.1; 455/507; 455/515; 709/227; 709/228; 709/229

(58) Field of Classification Search .......... 455/434, 455/435.1, 435.2, 435.3, 41.2, 507, 515; 370/252, 254, 310.2, 328, 329, 330, 338; 709/227–229
See application file for complete search history.

(56) References Cited

U.S. PATENT DOCUMENTS 6,522,881 B1  2/2003  Feder
(Continued)

FOREIGN PATENT DOCUMENTS

JP  10-041969  2/1998
(Continued)

OTHER PUBLICATIONS

B. O'hara, et al., "Architecture for Control and Provisioning of Wireless Access Points (CAPWAP)," CAPWAP Working Group Internet-Draft, Feb. 2004, pp. 1-35.

(Continued)

*Primary Examiner* — Olumide T Ajibade Akonai
(74) *Attorney, Agent, or Firm* — Dickinson Wright PLLC

(57) ABSTRACT

A method for negotiations between various entities of a wireless local area network (WLAN) including negotiations between controlling nodes (CNs) and wireless access points (WAPs) and negotiations between WAPs is disclosed. These negotiations are used for the purpose of establishing the capabilities of the various entities, determining how such capabilities may be optimally divided among the negotiating entities and then dividing the capabilities among the entities based on this determination. The capabilities include those required for the operation, control and management of the WLAN entities and the encompassing WLAN. The disclosed method introduces means for flexibly accommodating the varying degrees of differences in capabilities among the WLAN entities between the WLAN entities including dynamic changes in WLAN topologies.

6 Claims, 10 Drawing Sheets

U.S. PATENT DOCUMENTS

| | | | |
|---|---|---|---|
| 6,842,460 B1 * | 1/2005 | Olkkonen et al. | 370/465 |
| 6,965,605 B1 | 11/2005 | Amos | |
| 7,191,236 B2 | 3/2007 | Simpson-Young | |
| 7,478,146 B2 | 1/2009 | Tervo | |
| 7,606,208 B2 | 10/2009 | Benveniste | |
| 7,697,549 B2 | 4/2010 | Eran | |
| 7,764,639 B2 * | 7/2010 | Perrot et al. | 370/328 |
| 2003/0035464 A1 | 2/2003 | Dehner | |
| 2003/0163579 A1 | 8/2003 | Knauerhase | |
| 2004/0166857 A1 * | 8/2004 | Shim et al. | 455/436 |
| 2005/0053005 A1 | 3/2005 | Cain | |
| 2005/0059396 A1 | 3/2005 | Chuah | |

FOREIGN PATENT DOCUMENTS

JP          2000-069050          3/2000

OTHER PUBLICATIONS

H. Tang, et al., "Issues of the Radio Access Network with Distributed Radio Network Control Functions for Universal Mobile Telecommunication System," The 14th IEEE 2003 International Symposium on Personal, Indoor and Mobile Radio Communication Proceedings, Sep. 2003, pp. 931-935.

P. Calhoun, et al., "CAPWAP Problem Statement," CAPWAP Working Group Internet-Draft, Feb. 2004, pp. 1-9.

H. Cheng, et al., "Functionality Classifications for Control and Provisioning of Wireless Access Points," CAPWAP Internet-Draft, Feb. 2004 pp. 1-9.

B. O'hara, et al., "CAPWAP Problem Statement," draft-ietf-capwap-problem-statement-02, CAPWAP Working Group, Internet-Draft, Aug. 20, 2004, pp. 1-9.

"Part 11: Wireless LAN Medium Access Control (MAC) and Physical Layer (PHY) Specifications," Information Technology, Telecommunications and Information Exchange between Systems, Local and Metropolitan Area Networks, Specific Requirements, ANSI/IEEE Std 802.11, 1999 Edition (R2003), LAN MAN Standards Committee of the IEEE Company Society, 528 pages total, Jun. 12, 2003.

* cited by examiner

WIRELESS POINT THAT PROVIDES FUNCTIONS FOR A WIRELESS LOCAL AREA NETWORK TO BE SEPARATED BETWEEN THE WIRELESS POINT AND ONE OR MORE CONTROL NODES, AND METHOD FOR PROVIDING SERVICE IN A WIRELESS LOCAL AREA NETWORK HAVING FUNCTIONS SEPARATED BETWEEN A WIRELESS POINT AND ONE OR MORE CONTROL NODES

This is a divisional application of application Ser. No. 10/591,184 filed Aug. 30, 2006, which is a national stage of PCT/JP2005/003390 filed Mar. 1, 2005, which is based on Japanese Application No. 2004-058245 filed Mar. 2, 2004 and Japanese Application No. 2004-209470 filed Jul. 16, 2004, the entire contents of each which are incorporated by reference herein.

TECHNICAL FIELD

The present invention relates to the field of wireless local area networks and in particular to the operation of such networks in heterogeneous environments.

BACKGROUND ART

Wireless local area networks (WLANs) have invoked great interests from both consumers and the industry. The current most popular WLANs are based on the [Non Patent Document 1] standards. While these standards have helped the initial uptake of WLANs, in their current form, they are not suited for large-scale wireless network deployments. This is because the cost and control of WLAN entities become complex in large environments.

Currently, many WLAN equipment manufacturers have addressed large-scale deployments by introducing new split architecture. Here, control aspects of the [Non Patent Document 1] WLAN specifications are centralized at controller nodes (CNs) while other aspects are distributed to numerous wireless access points (WAPs). With the diversity of manufacturers and their implementations of the split architecture, there are incompatibilities between WLAN entities from different manufacturers.

There are currently some efforts to provide standardized means for managing large-scale WLANs in the Internet Engineering Task Forces (IETF) Control and Provisioning of Wireless Access Point (CAPWAP) working group. [Non Patent Document 2] describes the efforts of the CAPWAP working group. However these efforts do not consider the problems of accommodating WAPs with dissimilar functional capabilities within a single WLAN. As such these problems limit the development of the WLAN market.

Furthermore, it is expected that future deployments of WLANs will feature dynamic wireless networks. In such types of deployments, network topologies will change during the operational lifecycle of the WLAN to enable enhanced applications and services. WLAN elements in such networks will be provisioned with both wired and wireless connectivity to enable dynamic topologies. However current assumptions of WLANs (and also CAPWAP) only refer to static network topologies. So while current WLANs are capable of adjusting to the dynamic conditions of the wireless medium, they are unable to accommodate the effects of dynamic topology changes.

For example, current WLAN systems adjust to declines in the signal-to-interference ratio (SIR) of the wireless medium by increasing the signal transmission power. However such minor corrections are inadequate to accommodate the variances in latency and overhead introduced by changes in WLAN topology. Furthermore, these variances in latency and overhead impede the operation of the CAPWAP split architecture. This is because the split architecture is sensitive to delays due to the very nature of the distributed operations. The redundancies of WLAN and CAPWAP processing performed at intermediate wireless access points (WAP) of a dynamic CAPWAP topology together with the corresponding physical overheads are detrimental to the CAPWAP split operations.

Given such scenarios, WLAN entities currently available from various vendors are incapable of interoperation in a single WLAN and are also incapable of operation in a dynamic topology WLAN.

These problems refer to static differences between WLAN entities as they are results of differences in basic design. In addition to these, there are also problems related to dynamic differences between WLAN entities.

In particular, during the functioning of a WLAN, the processing load at a WAP can become substantially high even exceeding the processing capacity of the WAP. This could be due to increases in the number of associated mobile terminals (MTs) or due to increases in the volume of traffic from the associated MTs. These differences in processing load over time constitute a dynamic factor as they are dependent on the dynamics of the MTs.

These dynamic differences in processing load across the WAPs consisting of a WLAN have traditionally been addressed by affecting handovers of MTs from their associated WAPs where processing load is high, to re-associate the MTs with other WAPs where processing load is relatively low.

[Patent Document 1] discloses means for addressing dynamic differences in the levels of processing load at WAPs by means of proactive handovers of associated MTs. While [Patent Document 1] addresses the problem of dynamic differences in processing loads across WAPs, it does so by mandating that MTs associated with one WAP also be within the coverage areas of other WAPs so as to be able to perform handovers and re-associations. If a MT is not within the coverage area of one or more other assisting WAPs, it is then expected to physically displace to such a coverage area in order to relieve the first WAP of some processing load. These constraints are rigid and limit the efficacy of [Patent Document 1]. Such limitations are common to all handover-based methods.

[Patent Document 2] presents a method for WAPs to modify, based on prevailing processing load levels, the intervals between the beacon signals that they transmit in order to attract or dissuade MT associations. This method also involves the constraints of requiring a MT to be within the coverage areas of alternate WAPs where processing load is low or being agreeable to displace towards such areas.

[Patent Document 3] focuses on proactive MTs that make association decisions. However the method is also limited by the factors described earlier.

While such methods attempt to solve the problem of dynamic differences in processing load, they do so by introducing stringent prerequisites and thereby introduce more problems. Another shortcoming of [Patent Document 1], [Patent Document 2], [Patent Document 3] and other handover-based methods for dealing with dynamic differences in WAPs is related to the bulk shifting of communication sessions. In practice MTs maintain a number of communication sessions with the WAPs with which they are associated. As a result, it is very likely that the communication sessions of only one MT or a few MTs constitute a considerable amount of processing load at the WAP. If the WAP were to affect the said MTs to handover and re-associate with another WAP, the processing load at the first WAP would be reduced, however by adversely affecting the other WAP. The other WAP then becomes overloaded and reverses the handover to the first WAP. This may continue without delivering any net gains for the WLAN. This points out that the processing load is not finely distributed by methods of handovers. In other words, dynamic differences are not finely managed.

[Non Patent Document 1] Institute of Electrical and Electronics Engineers Standard 802.11-1999 (R2003)

[Non Patent Document 2] "CAPWAP Problem Statement", draft-ietf-capwap-problem-statement-02.txt

[Patent Document 1] "Method and apparatus for facilitating handoff in a wireless local area network", US 2003/0035464 A1

[Patent Document 2] "Dynamically configurable beacon intervals for wireless LAN access points", US 2003/0163579 A1

[Patent Document 3] "Method and apparatus for selecting an access point in a wireless network", U.S. Pat. No. 6,522,881 B1

DISCLOSURE OF THE INVENTION

In view of the above discussed problems, it is the objective of the present invention to provide an apparatus and method for negotiations between controlling nodes (CNs) and wireless access points (WAPs) of a WLAN based on policies that allow for accommodating static and dynamic differences among the WLAN entities including dynamic changes in WLAN topologies within a single WLAN.

It is another objective of the present invention to provide a method and policy for negotiations between WLAN entities for the purpose of determining selected subsets of functional, load or other components to be processed by each of said WLAN entities so as to accommodate variations in system design, processing load or network topology.

It is another objective of the present invention to provide an apparatus and method for negotiations between WLAN entities based on polices that allow for accommodating the dynamic differences between them such as differences in processing load levels at various WLAN entities within a single WLAN.

It is yet another objective of the present invention to provide means for accommodating the operations of split architecture WLANs in the presence of dynamically changing network topologies.

The disclosed invention relates to wireless local area networks (WLANs) and particularly to means of addressing the issues of static and dynamic differences among WLAN entities. It introduces policies for negotiations between WLAN entities for the purpose of accommodating these differences.

One aspect of the present invention deals with negotiations between controlling nodes (CNs) and wireless access points (WAPs) of a WLAN based on policies that allow for accommodating static differences among them. Specifically, it presents means for determining a flexible division in WLAN functionality between the negotiating entities. The present invention first involves classifying the functional capabilities of WLAN entities. The entities then determine the capabilities of other entities followed by negotiations between them on how best to divide the functionality among them. Further operations of the WLAN entities are then based on the determined division of functionality. This aspect of the present invention enhances interoperability for WLAN entities.

Another aspect of the present invention deals with negotiations between WLAN entities based on polices that allow for accommodating the dynamic differences between them. Particularly, it addresses the issue of distributing processing load among WAPs without requiring physical displacement of associated mobile terminals (MTs). It involves first determining the need to distribute parts of processing load at a WAP. This is followed by the determination of which parts of processing load may be distributed while at the same time maintaining existing association relationships between MT and WAP. Next, an overloaded WAP enters into negotiations with other WAPs in order to determine how the determined parts of processing load may be distributed among them. This aspect of the present invention overcomes the limitations of handover-based methods for managing dynamic differences between WLAN entities.

In its broadest aspect, the present invention provides a system for providing service in a WLAN whereby a control node negotiates with WAPs and provides similar or different complimentary functionality for each of the WAPs to form a complete functionality defined for the WLANs.

In its preferred form, the present invention allows for a controller module for control nodes to comprise a single or plurality of processing schedules composed of sequential lists of descriptors for subsets of functional components used for each wireless access point.

In another preferred form, the present invention provides a method for providing services in a WLAN wherein a control node dynamically discovers the capability of a WAP by sending a single or plurality of messages to a WAP containing a section that emulates the data unit sent by a mobile terminal, a WAP receiving said message processes said section using the same procedure for processing data units received from a mobile terminal and sends it back to said control node in a reply message and said control node obtaining capabilities information of said WAP by examining the processed data units in the reply message.

In another preferred form, the present invention allows a method for providing service in a WLAN that allows defined WLAN function split between WAPs and one or more control nodes wherein a subset of WAPs processes the total of their subset of functionality defined for the WLAN, a control node provides distinct subsets of complementary functionality defined for the WLAN to each of the subset of WAPs.

In yet another preferred form, the present invention allows for means for determining a flexible division in WLAN functionality between the negotiating entities. The present invention first involves classifying the functional capabilities of WLAN entities. The entities then determine the capabilities of other entities followed by negotiations between them on how best to divide the functionality among them. Further operations of the WLAN entities are then based on the determined division of functionality.

In another aspect, the present invention provides a system for load-balancing in a WLAN without requiring association handover at a mobile terminal whereby a data unit for a mobile terminal is processed with the complete WLAN functions by a single of plurality of WAPs where each WAP processes the data unit with only a subset of complete WLAN functions.

In its preferred form, the present invention allows for a method of carrying out load balancing in a WLAN without requiring a mobile terminal to change association relationship with a WAP wherein the WAP separates the processing functions provided to the mobile terminal into an association specific part and a non-association specific part, the WAP negotiates with another WAP to process the non-association specific part and establishes a secure tunnel, with the another WAP, the WAP tunnels a data unit from a mobile terminal to the another WAP through the tunnel after processing the data unit with the association specific part of functions and the another WAP receiving the processed data unit through the tunnel and processing it with non-association part of the functions.

In another preferred form, the present invention provides a method for determining the distribution of non-association specific functions based on information comprising the size of the data unit to be processed, the expected average time for processing a data unit, the overhead time for processing a data unit or a weighted sum of said information.

In another aspect, the present invention provides a method for accommodating variances in a wireless network topology wherein the method comprises the step of dynamically adapting the operations logic of at least one network entity of the wireless network topology to alter processing of one or more functional sub-components.

In its preferred form, the present invention allows for a method of accommodating variances in a WLAN by altering the processing of selected functional sub-components at at least one network entity by means of bypassing processing of said selected functional sub-components.

In its preferred form, the present invention allows for a method of accommodating variances in a WLAN by altering the processing of selected functional sub-components at at least one network entity by means of selectively processing said selected functional sub-components.

In another preferred form, the present invention provides a method for altering local-level functional semantics while maintaining system-wide functional semantics of a wireless network by selectivity activating functional sub-components of selected network entities such that the sum of activated functional sub-components across said wireless network corresponds to complete functional sub-components of said wireless network.

In yet another preferred form, the present invention provides a method for altering local-level functional semantics while maintaining system-wide functional semantics of, a wireless network by means of shifting the processing of said activated functional sub-components from a first network entity to a second network entity.

Based on the aspects and preferred forms of the present invention, the problem of incompatibility of WAPs of different functional capabilities is solved. The present invention also solves the problem of WLAN operations in dynamic topology environments. In yet another aspect, the present invention solves the problem of accommodating dissimilar volumes of processing loads over time.

BEST MODE OF CARRYING OUT THE INVENTION

The disclosed invention of policies for negotiations between entities of a wireless local area network (WLAN) is described in two major aspects, the first focusing on negotiations for accommodating static differences among WLAN entities also comprising accommodating changes in WLAN topologies. While the second aspect illustrates means of dealing with dynamic differences, particularly in levels of processing load.

In the following description, for purpose of explanation, specific numbers, times, structures, and other parameters are set forth in order to provide a thorough understanding of the present invention. However, it will be apparent to anyone skilled in the art that the present invention may be practiced without these specific details.

Figure 1:
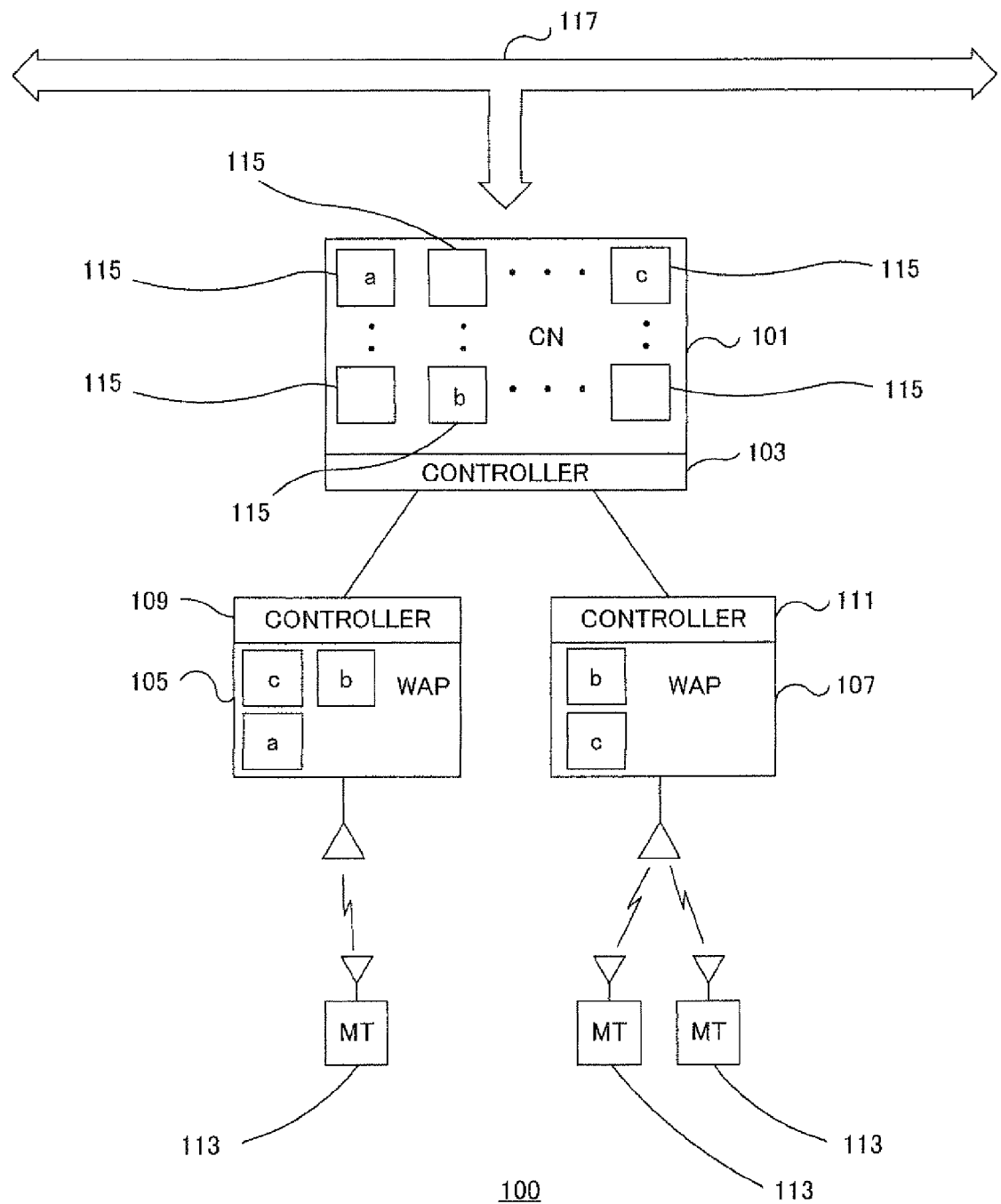
FIG. 1 is a diagram illustrating an operational representation of a wireless local area network (WLAN) system used to illustrate a first aspect of the disclosed invention dealing with policies for negotiations between WLAN entities, particularly between a controlling node (CN) and wireless access points (WAPs)

Negotiations for Accommodating Static Differences:

A WLAN system embodying a first aspect of the present invention dealing with accommodating static differences among WLAN entities is exemplified in FIG. 1. The diagram illustrates a WLAN system 100 comprising a controller node (CN) 101, a number of wireless access points (WAPs) 105 and 107, a plurality of mobile terminals (MTs) 113 and a network backbone 117. For the sake of simplicity, the WLAN system 100 is shown with a single CN whereas the system embodying the present invention may comprise any number of CNs. Also, the diagram indicates a direct connection between CN 101 and the WAPs 105 and 107. Alternatively there may be a number of intermediate nodes between them. Similarly, the connection between CN 101 and the network backbone 117 may also include a number of intermediate nodes. In all such cases, the disclosed invention holds scope.

The CN 101 provides support and control to the WAPs 105 and 107 that associate with it. A new WAP in the WLAN system must first choose and establish association relationships with one or more CNs before it receives support and control from the one or more CNs. As such, WAPs may simultaneously hold more than one association relationship with one or more CNs. Similarly, the MTs 113 choose and maintain associations with the WAPs, which in turn provide them with services. These services include radio transmission and reception, secure transport and mobility. An MT may maintain a number of associations with one or more WAPs, however FIG. 1 simplifies this with each MT maintaining only one association with one WAP.

It can be inferred about the WLAN system 100 that the WAPs connect to the network backbone via the CN. Alternatives to this include the WAPs connecting to the network backbone by other means possibly through other intermediate nodes. In such cases, the CN will only be responsible for the control and management of the WAPs associated with it, while connectivity to an external network may be handled by other entities.

FIG. 1 shows the CN 101 capable of performing the complete set of WLAN functional operations, as specified by some established WLAN standard. It is also capable of other control and management functional operations. Each functional operation is logically represented by one of the functional components 115. The operations represented by each of the functional components may include encryption, decryption, medium access control protocol data unit (MAC PDU) processing, authentication, association, quality of service (QoS) processing, Internet Protocol (IP) processing etc.

Each functional component is represented by a functional component code. For the purpose of illustration, some of the functional components in FIG. 1 are represented by functional component codes 'a', 'b' and 'c'. For example functional component 'a' may denote the processing required for a certain type of encryption, for example Wi-Fi Protected Access (WPA) or Advanced Encryption Standard (AES), functional component 'b' for QoS processing, for example priority handling, while functional component 'c' may be that for power control during radio transmission and reception. The functional components are logical units and may be implemented with a single processor using different sets of instructions and context for different functional components. Alternatively, each functional component may be implemented by individual processing entities possibly in disparate entities. While it is envisaged that the actual implementations of the functional components may vary among manufacturers and their implementations, the interfaces linking different components will be common or compatible so as to allow seamless processing of a control or data unit from one WLAN entity to another.

Since the WAPs may be from different manufacturers or of different implementations, they may incorporate among them varying degrees of WLAN functional components. These correspond to the different divisions in functionality between CNs and WAPs. For example, WAP 105 is shown to be capable of processing functional components 'a', 'b' and 'c' whereas WAP 107 is only capable of processing functional components 'b' and 'c'. The remaining functional components necessary for their WLAN operations and their control are left to be processed by CN 101. These differences between the WAP and CN entities represent the static differences that are to be accommodated by each other WLAN entity by means of the disclosed method for negotiations.

For the proper operation of the present invention, it is necessary for the CNs and WAPs from different manufacturers to follow pre-defined naming conventions for the functional components that they incorporate and recognize. This ensures that negotiating entities can precisely distinguish which functional components a peer entity implements. To this end, the functional component codes need to be consistent in representing various functional components. This convention however need not be followed strictly to the letter. For example, the convention may present standard descriptors for various functional components from which the negotiating entities may discern their properties. As an illustration, "IEEE 802.11i" describes an IEEE WLAN standard pertaining to security functionality. So based on such descriptors, negotiating CNs and WAPs may match parts or all of the names with other descriptors to infer the nature of the functionality components which the descriptors represent.

As mentioned earlier, the interfaces between functional components also need to be consistent across WLAN entities. This is to ensure that the processing of a control or data unit may be performed seamlessly from one WLAN entity to another. For example, a WAP may perform decoding with an appropriate functional component and then send the decoded data unit to a CN in a form suitable for further processing, say, a form that may be readily decrypted by a decryption functional component at the CN. So although there are different functional components in different WLAN entities, the interfaces between them are mutually recognizable so as to provide seamless processing.

Each WLAN entity is controlled in general by a controller entity. Thus, CN controller 103, WAP controllers 109 and 111 are responsible for the overall operations of CN 101, WAPs 105 and 107, respectively. While the WLAN system 100 shows the controllers to be integral to the WLAN entities, the controllers may also be separate entities. As such, they may remain disparate for each WLAN entity or combined together for a number of WLAN entities. It may be envisaged that specialized controllers exist for each type of entity.

The controllers are particularly responsible for establishing processing schedules for each of the entities that associate with the entities managed by the controllers. Consistent with this, the CN controller 103 maintains processing schedules for WAPs 105 and 107 whereas the WAP controllers 109 and 111 in turn maintain processing schedules for their respectively associated MTs 113.

A processing schedule refers to a sequence of functional components that are to be processed for control and data units received from associated devices by the entity that the said controller manages. For example, WAP controller 109 for WAP 105 maintains a processing schedule comprising a sequence of its functional components 'a', 'b' and 'c'. When a control or data unit arrives from an associated MT 113, WAP 105 performs the processing of functional components 'a', 'b' and 'c' based on the established processing schedule. The processing schedule at a WAP may be the same for all associated MTs if all the MTs incorporate consistent functionality. However if MTs implement different degrees of functionality, WAPs may also maintain separate processing schedules for processing the control and data units from different MTs.

In one embodiment of this first aspect of the present invention, WAP controllers 109 and 111 for WAPs 105 and 107, respectively, first perform a step 201 in the figure of discovering CNs. The CNs to be discovered may be within the same administrative domain as the WAPs or the CNs may belong to different administrative domains. This step of discovery may be accomplished based on any node discovery protocol or by the broadcast/multicast/anycast of a specific, mutually recognizable message invoking responses from available CNs.

Next the WAP controllers choose which among the discovered CNs to associate with in a step 203. One possible metric for this choice may be the round-trip latency between the WAPs and CNs. This metric has the advantage of allowing for prompt exchanges of control messages between the WLAN entities. Other metrics that may be used for CN selection include network status, congestion, subset of WLAN functions offered by CN, cost of using the CN, the vendor of the CN, the characteristics of the connection to the CN, link status, random selection, cost of using the link, manufacturer identification and a weighted sum of these metrics. Having chosen a CN 101 with which to associate, WAP controllers 109 and 111 then enter an association phase with the CN. This phase may include mutual authentication, exchanges of security information and the establishment of communication protocols for further exchanges.

Then, in a step 205, WAP controllers 109 and 111 enter a negotiation phase with CN controller 103 for the purpose of establishing means to accommodate the possible differences in their respective functional capabilities. In particular, the negotiations are to establish a division of WLAN functionality that is consistent with the capabilities of the negotiating entities and are optimal for the operation and management of the whole WLAN.

The negotiations may be initiated by either a WAP controller or a CN controller as in a step 207. WAP controllers initiate by sending information regarding the functional capabilities of the associated WAPs to the chosen CN. This information includes the appropriate codes corresponding to the functional components that the WAPs are capable of processing and their processing schedules. A CN controller initiates negotiations by requesting for functional capabilities information from the associated WAPs.

Upon receiving capabilities information from the associated WAPs and based on established policies, CN controller 103 determines an initial division of WLAN functionality. This division is then enforced between CN 101 and the associated WAPs 105 and 107 as in step 209. The functionality division specifies which of the functional components that can be processed by the WAPs needs to be active and processed by the WAPs themselves and which of them needs to be inactive so that they may be processed by the CN.

In one embodiment, the initial division of functionality is based on a policy that allows each associated WAP to process all the functional components that they are capable of. With such a division, only those functional components that an associated WAP cannot inherently process are left to the CN. Such functional components are then included in the processing schedule of the CN controller. Since WAPs may have dissimilar degrees of functional capabilities, the CN controller may be required to establish separate processing schedules for each associated WAP. As such this embodiment presents a policy which allows for the full capabilities of each WAP to be leveraged on. However this is achieved at the expense of running different processing schedules at the CN controller for different WAPs.

In another embodiment, the initial division of functionality is based on a policy in which the CN controller first determines a subset of functional components that are common across all associated WAPs. The associated WAPs must then process only the determined subset of functional components even if they are capable of processing other functional components. Therefore, the remaining set of functional components required to be processed for each associated WAP will be common to all of them. This common set can then be processed by the CN. This embodiment presents a policy in which the CN controller may maintain a single processing schedule for all associated WAPs. If a new WAP, incorporating functionality components fewer than or incompatible with those specified in the existing processing schedule, associates with the CN, the CN controller repeats the step of determining the subset of functional components that are common across all currently associated WAPs. It is noted that this step need not be performed if a new WAP involves more functionality components than that specified in the single, previously established processing schedule.

Alternatively, the association of a new WAP with a CN may invoke a grace period, in which two processing schedules are maintained simultaneously. The first corresponds to the existing processing schedule which was established before the association of the new WAP, while the second corresponds to the processing schedule which takes into account the functionality of the newly associated WAP. Then data units processed during the grace period are done so based on the processing schedule that is most appropriate. This embodiment provides uninterrupted services to existing MTs in the event of new WAPs associating with the CN.

In another embodiment, the initial division of functionality is based on a combination of policies, where a subset of associated WAPs is allowed to process all the functional components that they are capable of. Another subset of associated WAPs process only a common subset of functional components that they are capable of processing even if they have greater capabilities. The CN controller determines the subset of functional components that are common across all of the subset of associated WAPs. The remaining set of functional components required to be processed for each associated WAP will be performed by the CN. Therefore the remaining set of functional components will be distinct for each of the associated WAPs of one subset of associated WAPs and be similar for each of the associated WAPs of the other subset of associated WAPs.

Next, having determined an initial division of WLAN functionality, the division is then sent to the associated WAPs for confirmation as in a step 209. The WAP controllers in turn verify that the division is feasible and upon verification return a positive acknowledgement to the CN as in steps 211 and 213.

Given that some WAPs may implement functional components in a non-partitioned manner, for example in a hardwire system, such WAPs may not be able to adhere to the specified initial functionality division. In these cases, the WAPs send a negative acknowledgement to the CN with an updated processing schedule that indicates operational dependencies between their functional components as in a step 215. The CN controller then takes this new processing schedule into account and formulates another functionality division that may be compatible with the WAPs. If the new division is feasible, the WAPs return a positive acknowledgement and if not, the negotiations continue in a similar fashion. As a last resort, upon a fixed number of unsuccessful negotiation exchanges, the CN allows the WAPs to process all their functional components.

During the initial negotiation phase, either CN or associated WAP may choose to forcibly terminate further negotiations based on pre-defined policies and rules even before the negotiation phase is complete. These policies are enforced by either CN or WAP when it is inferred that further negotiations will be moot as in steps 219 and 221. For example, if the difference at the initial division of WLAN functionality is significantly dissimilar from the capabilities of a WAP, the WAP may choose to terminate negotiations as it may be futile to proceed further. Alternatively, if either entity determines that the other is illegitimate, the negotiations may be terminated. Many other policies may also be used to enforce termination of negotiations.

Once a functionality division is acceptable to all participating WLAN entities, CN controller 103 establishes appropriate processing schedules for associated WAPs 105 and 107 as in a step 217. These schedules define the sequence of functional components that are to be processed by CN 101 for control and data units received from associated WAPs 105 and 107. Then, CN controller 103 manages each associated WAP in a manner consistent with the processing schedules.

In one embodiment, WLAN functionality may be divided into four functional components that may be denoted by functional component codes 1, 2, 3 and 4. The functional component corresponding to code 1 relates to that parts of WLAN functionality concerning the radio aspects. This may include radio transmission and reception, coding, modulation, power control and beacon signal control. Such a division combining aspects concerning the radio interface will allow for simpler design. The code 2 functional component relates to security aspects, which may include authentication, association, encryption and decryption. The basis for this division is that processing for security involves mathematical computation for which reason they may be consolidated and optimized. Then, the functional component of code 3 deals with the processing required for control and data protocol data units (PDUs). This includes bridging, routing, retransmissions and Internet Protocol (IP) layer processing for which specialized network processors have been developed. Next, the code 4 functional component relates to the general control and management of the WLAN. Quality of Service (QoS) control, configurations and policy management are some of the aspects of this functional component. This embodiment presents simple and practical classification for WLAN functionality. Negotiations between various WLAN entities may then be based on these classifications. The classifications may also be used to describe different entities. For example, a WAP implementing only radio aspects of WLAN may be referred to as a type 1 entity which will then require a CN capable of the remaining functional components 2, 3 and 4.

Figure 2:
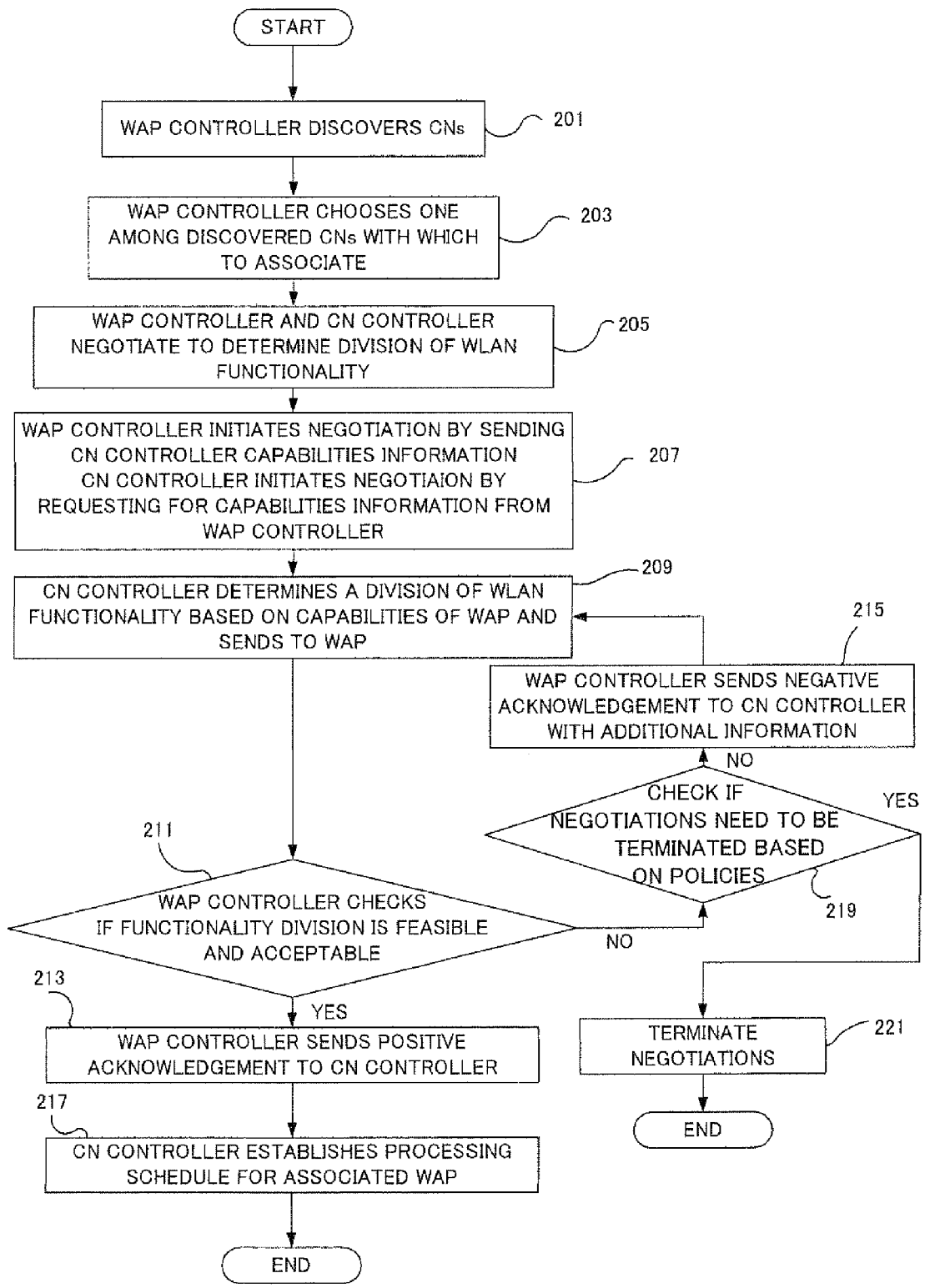
FIG. 2 is a diagram depicting the general operational steps involved in a first aspect of the present invention dealing with policies for negotiations between a CN and WAP.

In another embodiment of the first aspect, a WAP controller need not explicitly send its functional capabilities information to a CN controller, however rather the CN controller infers the capabilities of an associated WAP. Such means for automated capabilities discovery allows for easier determination of functional capabilities without requiring the explicit exchange of functional component codes between a CN and associated WAPs. In this embodiment, a CN controller sends a special command to an associated WAP to which the WAP responds by generating a data unit and processing it based on its functional components. The emulated data unit is then sent to the CN after being processed by the WAP. The CN controller then infers the functional capabilities of the associated WAP based on the received emulated data unit. Subsequent operations then follow from a step 209 in FIG. 2. This embodiment requires associated WAPs to be capable of recognizing and responding to the special command issued by the CN controller.

An alternate form of the embodiment involves a CN controller simulating a data unit as if it was a mobile terminal and sending the simulated data unit to an associated WAP. The destination address of the simulated data unit is set to be the CN itself. Upon receiving the data unit, the WAP performs its processing based on its capabilities and forwards the processed data unit back to the CN. The CN controller then infers the functional capabilities of the associated WAP from the processed data unit. After this, the CN controller devises an initial division of WLAN functionality and sends this to the associated WAP. Subsequent operations then follow from a step 209 in FIG. 2.

Figure 3:
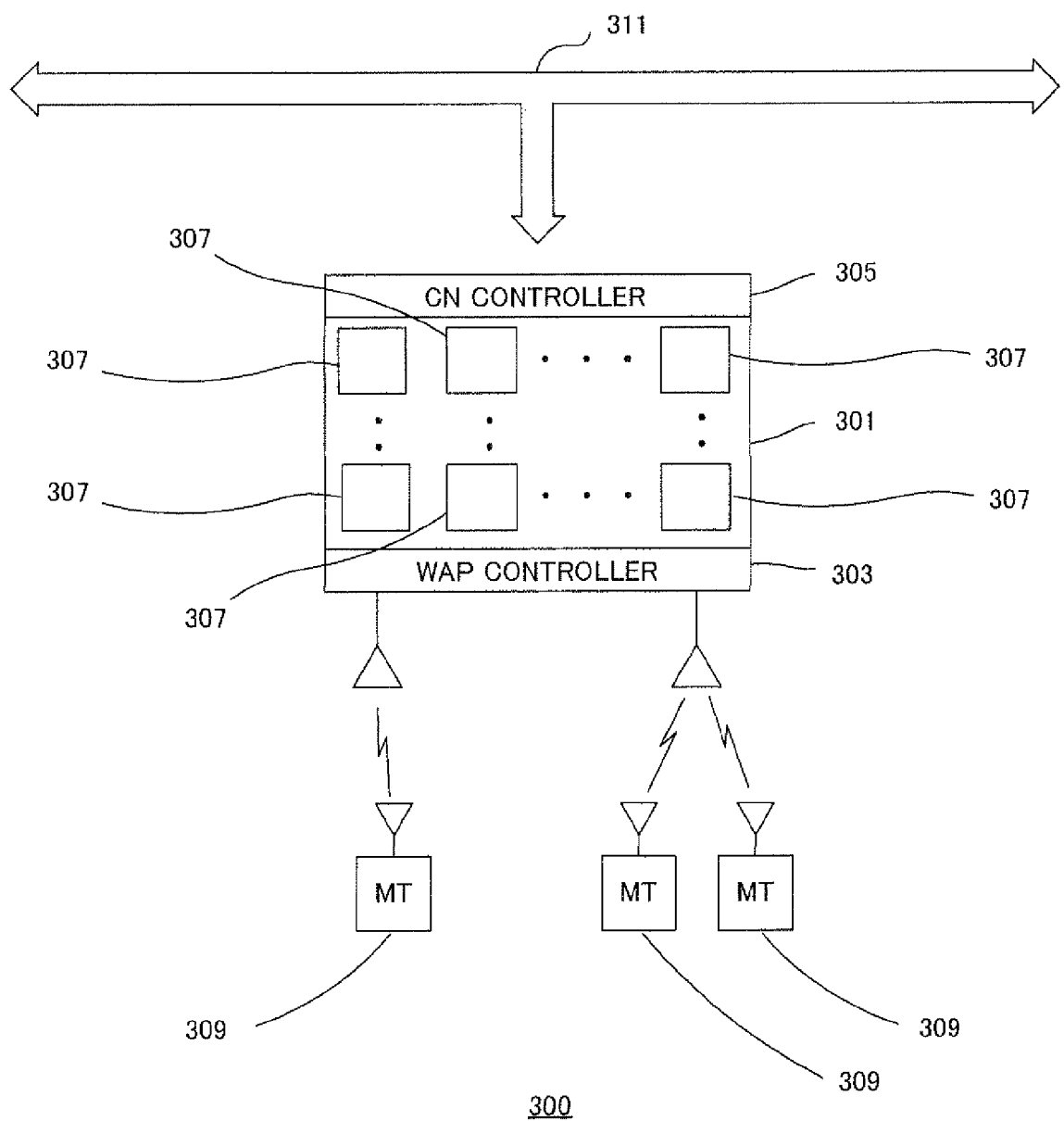
FIG. 3 is a diagram showing an integrated WLAN entity exemplifying one embodiment of a first aspect of the present invention in which the capabilities of a CN and WAP are integrated into one entity.

In another embodiment of the present invention, a single entity that integrates both WLAN operational functionality and control and management functionality is presented. FIG. 3 exemplifies this embodiment in that it illustrates such an integrated WLAN entity 301. The integrated WLAN entity 301 is capable of both WAP operations and CN control and management operations for which there are a WAP controller 303 and a CN controller 305, respectively. Each of the WAP and CN functional operations is logically represented by one of the functional components 307 each denoted by a functional component code. These functional components encompass WAP operations like radio transmission and reception, in addition to CN operations like WLAN monitoring and configuration management.

The set of functional components 307 are common to both WAP and CN controllers so that the processing schedule at each controller may include any of the functional components. Each controller operates in an independent manner with the understanding that the complete set of functional components is available for it to schedule. As such, during the negotiations phase between WAP controller 303 and CN controller 305, the WAP controller sends its capabilities information so as to include the complete set of codes corresponding to all of functional components 307.

Associated with the integrated WLAN entity 301 is a number of MTs 309. WLAN system 300 shows the associated MTs 309 connecting to a network backbone 311 via the integrated WLAN entity 301. It is also possible for this connection to be made through alternate means like that through other intermediate nodes. To the associated MTs however, there is no difference between an ordinary WAP and the integrated WLAN entity.

Operationally, in this embodiment, the WAP controller of an integrated WLAN entity first performs a discovery of CNs. In essence, the discovery results in finding itself as a CN. Upon discovery, an association phase follows after which the CN controller and WAP controller enter a negotiations phase. Discovery and association are token operations as both the WAP and CN reside within a single entity.

Next, the WAP controller and CN controller begin negotiations in order to determine a suitable division of functionality between them. The WAP controller first sends information regarding its capabilities to the CN controller. This information will include the functional component codes corresponding to all the functional components available within the integrated WLAN entity and a processing schedule that involves all the codes. In response to the capabilities information and based on established policies for functionality divisions, the CN controller devises an initial division of functionality and sends this to the WAP controller. The initial division of functionality will be feasible and acceptable to the WAP controller since its feasibility is based on that of the CN controller which in turn determines the division. As a result, the WAP controller sends a positive acknowledgement to the CN controller. Then both controllers establish processing schedules according to the accepted division in functionality and operate on that basis. This embodiment illustrates how the process of negotiations may take place within an integrated WLAN entity. As such, the disclosed invention will be consistent will various designs for these entities.

In another embodiment of the first aspect of the present invention, different CNs may incorporate varying degrees of functionality. As such, a WAP associating with a CN may require the processing of functionality which is unavailable both with itself and with the CN that it associates. This embodiment serves to address such situations by allowing the various CNs in a WLAN to negotiate among them for the purpose of accommodating differences in their functional capabilities. The CNs may follow the steps put forth in FIG. 2 to determine how the static differences in their functionality may be managed. For example, a first CN may only incorporate 2 types of functional components and it may necessitate in a third component that it is not capable of, but yet it is required for providing services to the WAPs associated with it. In such a case, the first CN discovers and associates with a second CN in the WLAN with which it then negotiates. The negotiations are for the purpose of dividing functionality among the CNs. As a result, the first CN may allow processing of the third functional component to be performed by the second CN.

Figure 8:
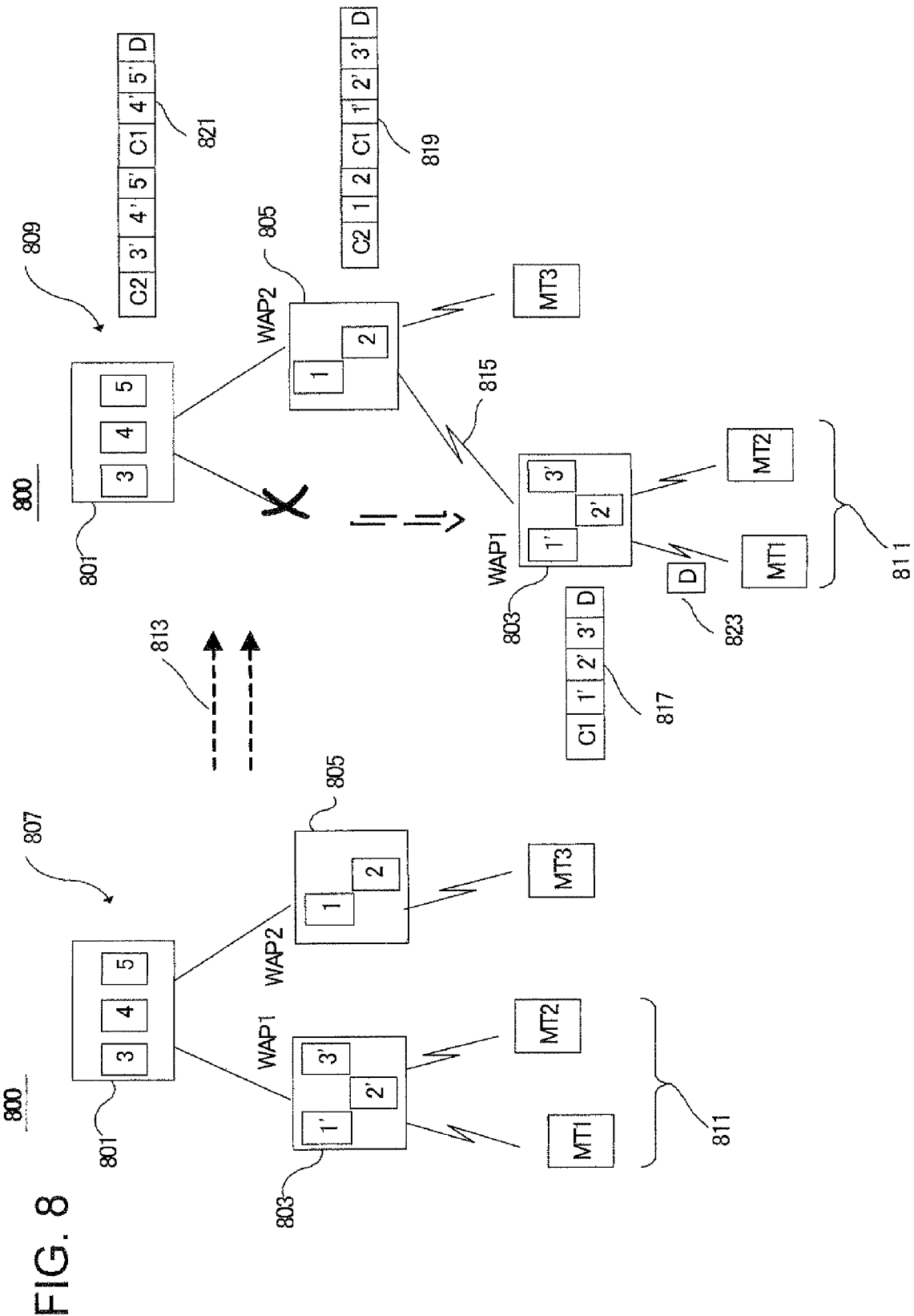
FIG. 8 is a diagram illustrating one embodiment of a first aspect of the present invention in which negotiations strategies are applied to enable CAPWAP split operations in dynamic WLAN topologies.

In yet another embodiment of a first aspect of the present invention, dynamics changes in WLAN topologies is addressed. FIG. 8 illustrates the general aspects of a CAPWAP based dynamic WLAN system 800. Here, WLAN functions (represented by functional components 1 through 5) are divided between the central controlling node 801 and the set of distributed wireless access points, WAP1 803 and WAP2 805. It is emphasized that the central controlling node 801 is capable of managing WAPs, WAP1 803 and WAP2 805, of dissimilar capabilities.

The first instance of the topology 807 represents a static case of operation. Here, WAP1 803 and WAP2 805 have fixed connections in the WLAN system 800. Then a transition 813 occurs in which the WLAN system 800 transforms into the second instance of the topology 809. In this instance, WAP1 803 displaces to an alternate location in which it establishes a new connection 815 to the controlling node 801 via WAP2 805. The transition 813 represents a dynamic change and the second instance 809 represents a new WLAN topology in which WAP1 803 still provides services to its mobile clients 811. At the same time, WAP1 803 behaves as another mobile client to WAP2 805.

In the second instance of the topology 809, the communication unit 823 exemplifies the communication traffic from the mobile clients 811. The communication unit 823 is first handled by WAP1 803 (as seen by a step 817) where all three WLAN functional components and the CAPWAP control component are processed. It is noted that this step 817 also adds physical overhead in the form of a CAPWAP protocol header in addition to the header required for transmission to WAP2 805. This is illustrated by the 'C1' sub-field of a step 817. Next, at WAP2 805, a step 819 is performed where again another set of WLAN functional and CAPWAP control components are processed. Next, in a step 821, the central controller 801 performs complementary functions for each of the steps 817 and 819. Based the sub-fields of step 821, it is clear that central controller 801 duplicates some of the complementary functions. It is the aim of the present invention to avoid this processing duplication and transmission overhead.

Figure 10:
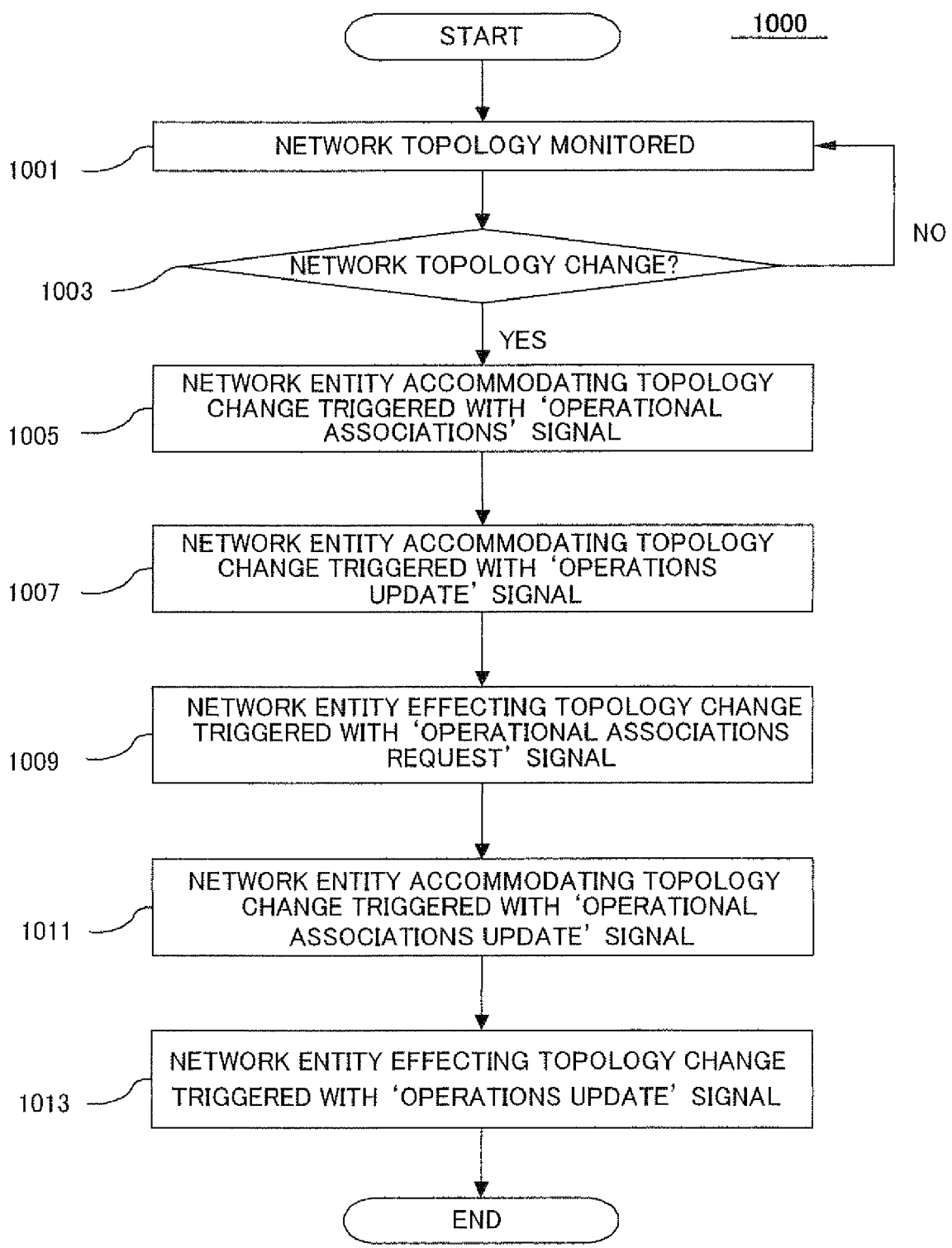
FIG. 10 is a diagram depicting a sequence of steps of a first aspect of the present invention in which dynamic WLAN topologies are enabled.

The operations of the present invention are herein described with respect to the steps in FIG. 10. In the steps 1001 and 1003, the topology of the wireless network is monitored so as to determine any changes in the network configuration. Means of realizing these steps is to analyze the header fields of received communication units and compare them to pre-established representations of network topology. For instance, in the case of IEEE802.11 specifications based WLANs, if the controlling node 801 receives an Association Request from WAP2 805 for a mobile client with credentials corresponding to WAP1 803, it is inferred that the topology between the controlling node 801 and WAP1 803 now includes the WAP2 805. Another means of establishing topology change is by periodically exchanging information on neighbouring network entities. A variance in these exchanges implies an alternate topology.

Once a network topology change has been determined, the network entity that will accommodate the change, WAP2 805, is triggered with an 'Operational Associations' signal as in a step 1005. This signal comprises preliminary state information regarding the network entity affecting the topology change, WAP1 803, and the mobile clients 811 managed by said WAP1 803. In one embodiment based on the IEEE802.11 specifications, the preliminary state information comprises the number of mobile clients 811 managed by WAP1 803, association identifications for mobile clients 811 and Source MAC addresses of the mobile clients 811. The preliminary state information may also comprise additional state information exemplified by the MAC address of network entity effecting topology change, WAP1 803. Next, in a step 1007, the network entity accommodating the topology change, WAP2 805, is triggered with an 'Operations Update' signal to adapt its functioning so as to handle the topology change. In one embodiment based on the IEEE802.11 specifications, the 'Operations Update' signal comprises a code value corresponding to an action 'Forward Frames to Transmission Block' and a code value corresponding to those 'Data Frame' type for which said action is to be taken for. The 'Operations Update' signal may also comprise additional parameters exemplified by 'Basis Service Set Identification (BSSID)', 'Source MAC address' or 'Destination MAC address'. In another embodiment based on the IEEE802.11 specifications, the 'Operations Update' signal affects the Medium Access Control (MAC) management and control logic of WAP2 805. Specifically, the logic is altered such that communication frames from the mobile clients 811 managed by the network entity effecting the topology change (WAP1 803) may now be managed by WAP2 805 without going through the normal association and authentication phases. In yet another embodiment this logic alteration is realized by modifying the 'Filter_MPDU' process of the 'Reception' block of WAP2 805 so as to direct all communication frames received from the mobile clients 811 to the normal sequence of processing. Alternatively, the associations and authentications may be pre-established by the controlling node 801.

After the network entity accommodating the topology change, WAP2 805, is updated, an 'Operational Associations Request' signal is triggered at the network entity effecting the topology change, WAP1 803, as in a step 1009. In one embodiment based on the IEEE802.11 specifications, the 'Operational Associations Request' signal comprises code values corresponding to 'Security Algorithm Type', 'Security Key', 'Session Identification' or 'Association Identification' parameters for which corresponding information values are requested. The request signal is to obtain specific state information regarding WAP1 803 and the mobile clients 811 which it manages. This state information is then made aware to WAP2 805 by an 'Operational Associations Update' signal, as in a step 1011, in preparation for future functioning. In one embodiment based on the IEEE802.11 specifications, the 'Operational Associations Update' signal comprises information values corresponding to 'Security Algorithm Type', 'Security Key', 'Session Identification' or 'Association Identification' parameters.

Next, in a step 1013, an 'Operations Update' signal is triggered to the network entity effecting the topology change, WAP1 803, so as to alter its functioning logic. In particular the signal directs WAP1 803 to bypass certain processing that may be duplicated at WAP2 805 (so that WAP2 805 neglects the processing at WAP1 803, and performs the processing at only WAP2 805). The intent of the step 1013 is to prevent duplication of WLAN and CAPWAP processing at both WAP1 803 and WAP2 805. Furthermore, bypassing of processing at WAP1 803 reduces the physical overhead for transmissions over the newly established wireless connection 815 and thereby reduces transmission delays. These two aspects combined ensure that the timing constraints between WAP1 803 and controlling node 801 are maintained according to the initial topology instance.

In one embodiment based on the IEEE802.11 specifications and CAPWAP framework, Operational Association state information is exchanged between the network entities accommodating topology changes and network entities effecting topology changes via the central controlling node.

In an alternative to the above described embodiment for exchanging Operational Association state information, said exchange is accomplished between the network entities accommodating topology changes and network entities effecting topology changes without establishing explicit operational associations between them. The network entity effecting the topology change, WAP1 803, is instructed to use a specific 'Frame Type' code for communication frames containing state information. Next, an 'Operations Update' signal is triggered to the network entity accommodating the topology change, WAP2 805, so as to enable it to handle communication frames with the specific 'Frame Type' code in alternate means. Alternatively, specific 'Subtype', 'Duration/ID' codes are used. Specifically, the alternate means comprises de-capsulation of payload of said communication frames and using the payload as state information. In one case of the embodiment, the controlling node 801 governs the various trigger signals.

In the dynamic CAPWAP framework, the network entity effecting topology change, WAP1 803, communicates with the controlling node 801 via the network entity accommodating topology change, WAP2 805.

In steps 1007 and 1013, the local-level of WLAN and CAPWAP functional semantics (wherein functional semantics corresponds to the set and sequence of processing required for WLAN operation) are broken such that selected sub-components of said processing are bypassed at selected network entities, the network entities accommodating topology changes and the network entities effecting topology changes. However, with the combined steps of 1000 the present invention achieves system-wide semantics of WLAN and CAPWAP functional processing by dividing selected processing sub-components among the controlling node 801, WAP1 803 and WAP2 805. So the steps of 1000 selectively activate various processing sub-components and by doing so, achieve system-wide functional semantics. It will be clear to those skilled in the art that the steps put forth in 1000 may be combined, separated or generally altered for the purposes of optimization, implementation or any other aim without deviating from the essence of the present invention. As such the scope of the present invention is not limited to the specific steps of 1000.

Figure 9:
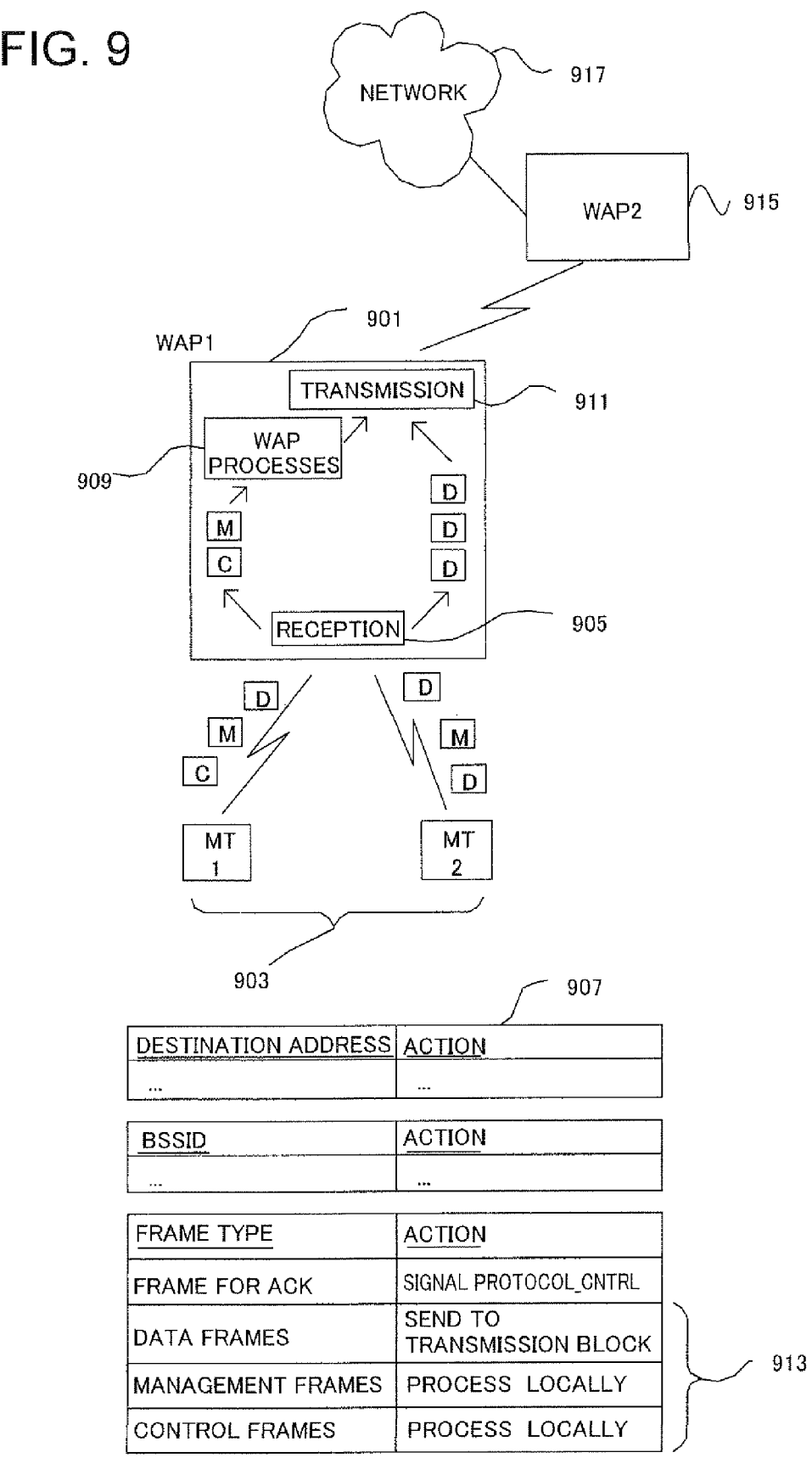
FIG. 9 is a diagram exemplifying a particular embodiment of a first aspect of the present invention relating to IEEE802.11 WLAN specifications.

FIG. 9 illustrates an embodiment of the present invention operating on steps 1000 for the WAP1 901. The logical operations of WAP1 901 are based on the IEEE802.11 WLAN specifications but may readily exemplify other wireless specifications also. WAP1 901 manages mobile clients 903 by processing various data (D), management (M) and control (C) frames in addition to general operations. The processing logically comprises 'Reception' 905, 'WAP Processes' 909 and 'Transmission' 911 blocks. The 'Reception' block 905 further comprises a 'Filter_MPDU' process whose logic is based on a filter 907. The filter 907 is used to compare arriving frames based on various metrics and appropriately handle them.

In response to the 'Operations Update' signal of step 1013, the filter logic is updated to include the changes of filter logic update 913. In the embodiment, data frames are directly sent to the 'Transmission' block 911 completely bypassing the 'WAP Processes' 909. As a result, processing time for the majority data frames is drastically reduced at WAP1 901. These data frames are then handled by WAP2 915 whose operations were updated according to a step 1007. Since management and control frames directly relate to the connection between WAP1 901 and the mobile clients 903, they are processed locally at WAP1 901. So the present invention selectively activates processing by affecting the reception logic of WAP1 901.

In one embodiment, the network entities accommodating topology changes and the network entities effecting topology changes operate according to dissimilar wireless specifications. With respect to FIG. 8, WAP1 803 operates according to IEEE802.11 specifications and WAP2 805 operates according to IEEE802.16. The principles of adapting local-level functional semantics while maintaining system-wide functional semantics are then applied to the network entities operating according to dissimilar wireless specifications. It is noted that the dissimilarity in operations may comprise Bluetooth connectivity, IEEE802.20, cellular telephony or any other wireless specifications.

There are a number of scenarios and applications in which the present invention for dynamic WLAN topologies will be incorporated. For example, future home networks will be capable of extending coverage areas in impromptu manners. Transportation systems will incorporate transmission and reception components so that the network topology changes with each passing stop, station or seaport. Manufacturing facilities will be provisioned with communication networks providing connectivity to diverse locations at various time instances. The present invention described insofar may be embodied in these scenarios to address the problems of latency and overhead in dynamic topology environments.

The embodiments of this first aspect of the present invention described insofar illustrate policies with which WLAN entities may negotiate with each other in order to accommodate the varying degrees of static differences that each such entity incorporates. Additionally, the embodiments illustrate the application of the first aspect of the present invention wherein local-level of functional semantics are broken so as to enable dynamic changes in WLAN topologies in which system-wide functional semantics are maintained. They describe how WAPs incorporating varying degrees of WLAN functionality may be integrally managed by a controlling node. The disclosed method for negotiations provides for flexibility in deploying WLANs with entities from different manufacturers or of different implementations. While prior arts focus on mandating proprietary means of dividing functionality among WLAN entities, the present invention serves to accommodate entities of different degrees of functionality. As a result, the division of WLAN functionality between controlling nodes and wireless access points may be achieved in a flexible manner.

Negotiations for Accommodating Dynamic Differences:

This aspect of the present invention describes policies with which WLAN entities embodying the disclosed invention may negotiate with each other for the purpose of accommodating dynamic differences among them. It is exemplified by using the varying levels of processing load at different WLAN entities particularly WAPs.

Figure 4:
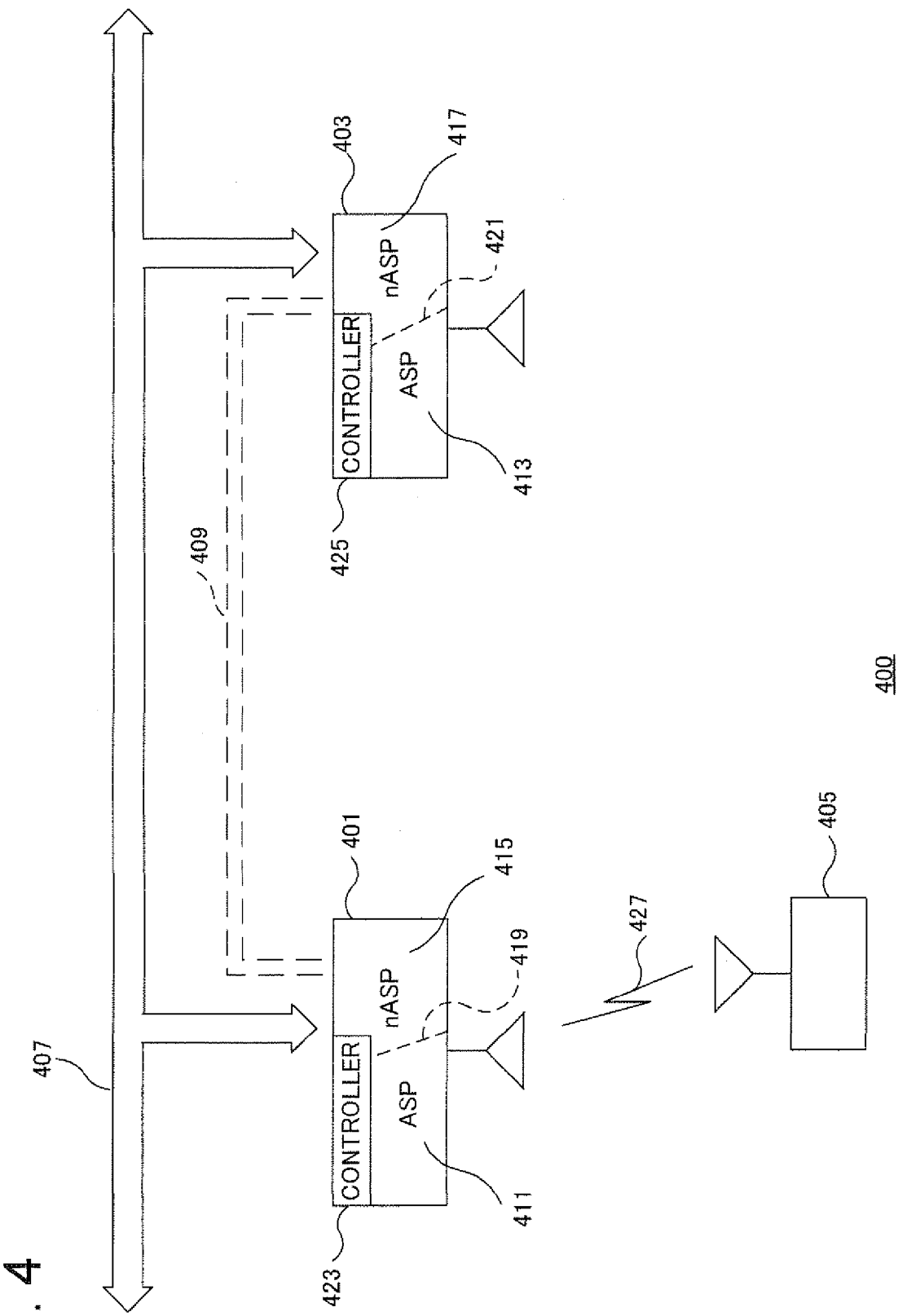
FIG. 4 is a diagram illustrating a simplified framework for a second aspect of the present invention dealing with policies for negotiations for the purpose of accommodating dynamic differences among WLAN entities, particularly between WAPs.

A simplified representation of a WLAN system 400 embodying this aspect of the present invention is depicted in FIG. 4. It shows WAPs 401 and 403 that are capable of providing services and performing related processing for a number of associated MTs. The WAPs and MTs may maintain a number of associations with each other. However for reasons of simplicity, the WLAN system 400 only shows one association with WAP 401 for the single MT 405. This MT 405 is associated with and receives services from WAP 401 over a wireless connection 427. Also the WAPs 401 and 403 are shown to be connected to a network backbone 407, through which they can communicate with other networks and with each other, either directly or via intermediate switching or routing devices. The WAPs may also connect to the network backbone or with each other through a number of intermediate nodes.

During the operation of WLAN system 400, the processing loads at the WAPs may vary due to the dynamic nature of communication. For example, a number of new MTs may choose to associate with a WAP thereby necessitating in additional processing at the WAP. Another example is of a MT choosing to be involved in additional numbers of communication sessions again resulting in extra processing for the WAP with which it is associated. Consequently, the processing load at various WAPs in the WLAN system will vary over time. It is this dynamism that the disclosed invention addresses by requiring WAPs to negotiate with each other for the purpose of distributing processing load from a heavily loaded WAP to a relatively lightly loaded WAP while maintaining existing association relationships with their MTs.

From FIG. 4, WAPs 401 and 403 provide services to associated MTs by performing some type of processing on their behalf. The processing may be logically divided by lines 419 and 421 in WAPs 401 and 403, respectively, as being association-specific (ASP) and non-association-specific (nASP) processing. ASP processing 411 and 413 involve those that are directly dependent on the association between MTs and WAPs. Such processing requires interaction with the wireless interface between a WAP and an associated MT. Examples of ASP processing include transmission and reception of data units, power control, coding and modulation.

nASP processing 415 and 417 refer to processing that are not directly dependent on the wireless aspects of a connection between WAPs 401 and 403 and associated MT 405. Examples of nASP processing include bridging, filtering, protocol data unit (PDU) processing and PDU delivery.

WAP controllers 423 and 425 manage and control he overall processing at WAPs 401 and 403, respectively.

Figure 5:
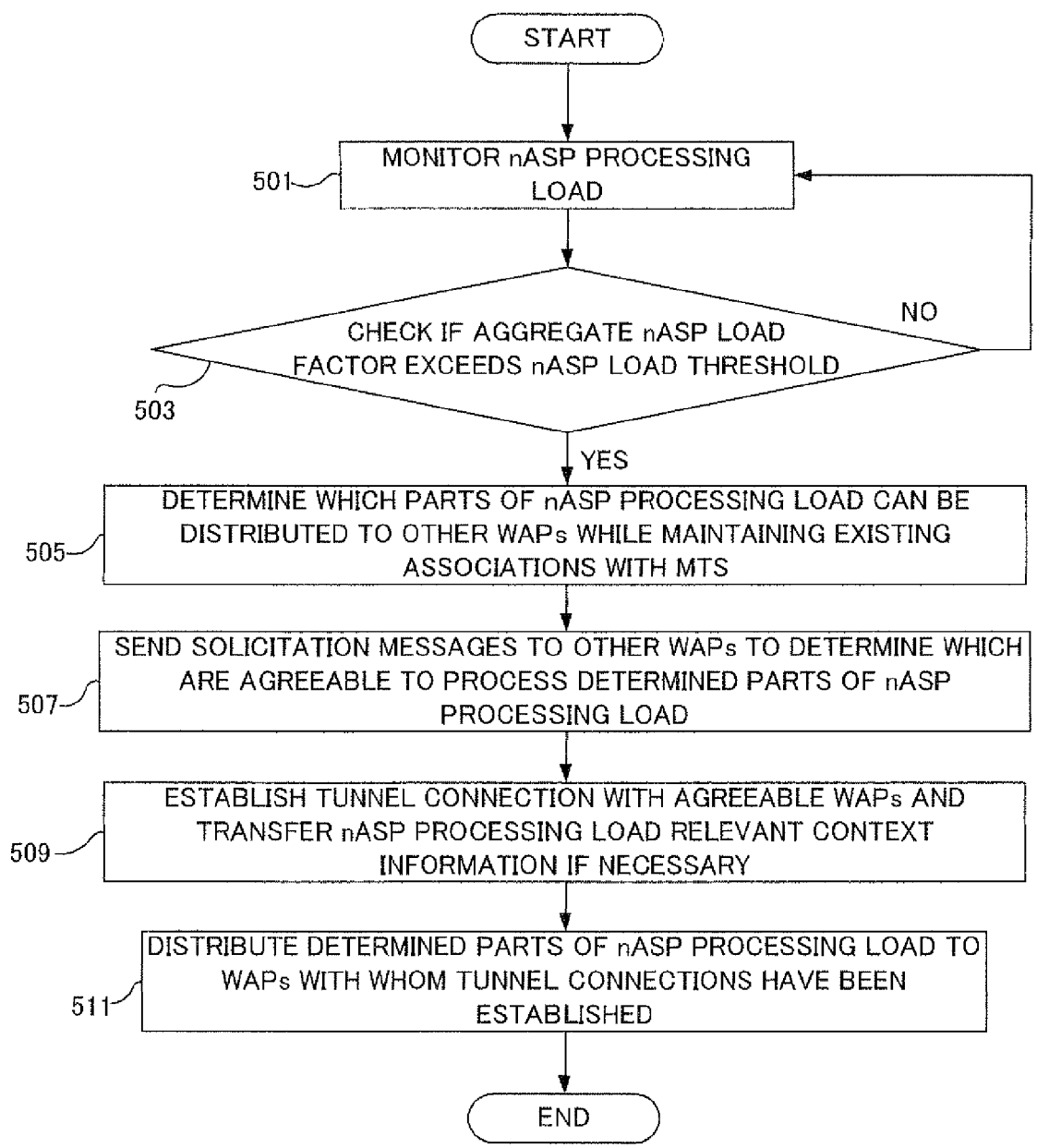
FIG. 5 is a diagram depicting the general operational steps involved in a second aspect of the present invention dealing with policies for negotiations for accommodating dynamic differences among WLAN entities. Specifically, it deals with processing loads at various entities.

The operations involved with this aspect of the present invention are described with reference to FIG. 5. The WAP controller in each of the WAPs in a WLAN system embodying the present invention performs a step 501 of monitoring the nASP processing load at the WAP. This includes monitoring the nASP processing load for each of the communication sessions for all the associated MTs. Examples of how processing load may be monitored include means for monitoring the processor usage or duration of processor activity for a communication session and then aggregating this for all communication sessions. Another example is means for monitoring the amount of memory usage for communication sessions. Similarly, a number of other factors may be monitored, either independently or in any combination, to monitor the overall nASP processing load at a WAP. Furthermore, other means of monitoring may also be used.

In one embodiment of the present invention, a WAP controller 423 for a WAP 401 derives a resource characteristic for the WAP based on the various factors of nASP processing load that are monitored for each communication session of the associated MTs. The resource characteristic is a representation of the resources or processing load required for providing services to a communication session.

Next, the resource characteristics of all communication sessions for all associated MTs are combined to obtain an aggregate nASP load factor for WAP 401. The aggregate nASP load factor is then compared to a nASP load threshold, in a step 503, to determine impending nASP processing overload conditions that may not be manageable by WAP 401. If the aggregate nASP load factor is determined to be manageable at WAP 401, the monitoring of a step 501 is repeated.

If, however, impending nASP processing overload conditions are determined, the WAP controller 423 then determines in a step 505, which parts of the nASP processing load at WAP 401 may be distributed to other WAPs of the WLAN system with the aim of reducing overall processing load at WAP 401 while at the same time maintaining existing association relationships with associated MTs, such as that with MT 405. Such a mechanism is unique from traditional methods of distributing processing load which mandate handovers that may necessitate in a MT physically displacing to a coverage area of another WAP. The step 505 is based on the resource characteristics of the communication sessions of MTs associated with WAP 401. For example, a WAP controller may choose to distribute those parts of processing load with the greatest resource characteristics or those with the least resource characteristics. This choice may also be based on other factors such as the expectation of future changes in resource characteristics.

Next, the negotiations phase begins between a first WAP controller and other WAP controllers. This phase involves determining which of the other WAPs are agreeable to accommodate the dynamic differences in processing loads by taking over some parts of the nASP processing load of the overloaded first WAP. In a first stage of negotiations, the WAP controller 423 executes a step 507 of sending solicitation messages to other WAPs of the WLAN system. The solicitation messages include the resource characteristics of those parts of nASP processing load of WAP 401 that have been determined by the WAP controller to be distributed to other WAPs.

WAP controllers receiving the solicitation message determine if they are capable of accommodating the additional processing load as specified in the message. These controllers then respond to the WAP controller initiating the solicitation by either accepting to take over the complete specified load or accepting to handle partial amounts of the load. The initiating WAP controller then uses the responses to determine which of the other WAPs are agreeable and to which extent agreeable, to receiving parts of the nASP processing load that it initially specified. The negotiations may also extend beyond the initial solicitation message if such a need is inferred to exist by the initiating WAP controller. As such, a step 507 is used to determine which of the other WAPs in the WLAN system are agreeable to receiving and perform processing of parts of nASP processing load of WAP 401 in order to reduce the processing load at WAP 401.

Next, in a step 509, WAP controller 423, of the overloaded or soon to be overloaded WAP, establishes a tunnel connection 409, between WAP 401 and the WAPs determined in a step 507 to be agreeable to receiving and processing the determined parts of nASP processing load of WAP 401. FIG. 4 illustrates one of the agreeable WAPs to be WAP 403. Relevant context information required for processing of the determined parts of nASP processing load is then transmitted over the established tunnel connection to the agreeable WAPs. Then, in a step 511, WAP controller 423 distributes the determined parts of the ASP processing load of WAP 401 to the agreeable WAPs over the tunnel connection. In doing so, WAP controller 423 reduces the overall processing load at WAP 401. All this is achieved while maintaining existing associations with associated MTs and in a fine grained manner so as not to overwhelm the agreeable WAPs.

This embodiment illustrates the efficacy of this aspect of the present invention in distributing processing load without the limitations of existing handover-based methods. As such, there are no constraints as to the geographic position or willingness to displace for the associated MTs.

In another embodiment of this aspect of the present invention, an overloaded WAP simply relays the processing load required for communication sessions of associated. MTs to other agreeable WAPs. This relay may be over wireless, wired or a combination of both types of links. Relevant context information may also be relayed so as to facilitate the processing of the relayed processing load.

In one embodiment, the tunnel connection between two WAPs is established over a direct link between WAPs. This direct link may be wireless and similar to the link between WAPs and MTs in which case the WAPs determine a radio channel alternate from the channel used for communication with associated MTs and use this to exchange relevant context information and determined parts of nASP processing load. Alternatively, the link between two WAPs can be wired and directly connected. With this embodiment, the tunnel connection need not traverse the network backbone but rather can be established directly.

In another embodiment of the present invention, nASP processing load is defined as the processing required for security algorithms used for the encryption and decryption of MAC PDUs that are transmitted to and received from associated MTs. Processing of security algorithms is a type of non-association-specific processing which is computationally intensive due to the complex characteristic. As such, a significant increase in the number of associated MTs or in the volume of traffic to and from associated MTs will in turn lead to a corresponding increase in the processing of the security algorithms. In this embodiment, WAPs and associated MTs encrypt their respective transmissions over the wireless connection based on an established security algorithm. Upon receipt of transmissions, the WAPs and MTs perform decryption processing based on the same established security algorithm.

When the nASP processing load for encryption and decryption becomes significant, as measured by its resource characteristic exceeding a nASP load threshold, a WAP controller 423 of WAP 401 sends a solicitation message to determine which of other WAPs in the WLAN system are agreeable to receiving and processing parts of nASP processing load corresponding to the security algorithms used for transmissions between WAP 401 and MT 405. If WAP 403 is agreeable to processing the nASP processing load, its WAP controller 425 responds to the solicitation message. Upon receipt of the response to the solicitation message, WAP controller 423 establishes a tunnel connection 409 to WAP 403 and then sends relevant security keys and context information to WAP 403 via the established tunnel connection.

Next, upon establishment of the tunnel connection 409 and exchange of the security keys and context information, WAP controller 423 sends to WAP 403 encrypted MAC PDUs received from associated MT 405. WAP controller 423 also sends to WAP 403, MAC PDUs that are to be encrypted before transmission to the associated MT 405. WAP 403 then processes the nASP processing load for encryption of MAC PDUs and sends the encrypted MAC PDUs to WAP 401 via the tunnel connection. Having received the encrypted MAC PDUs, WAP 401 then transmits them to the associated MTs. In this embodiment, the computationally intensive processing of security algorithms is distributed across WAPs so as to lower the processing load at a WAP. This is performed without affecting re-associations of MTs and as such this method is not limited by the shortcomings of handover-based methods.

In another embodiment, a WAP controller distributes the nASP processing load corresponding to those security algorithms that cannot be processed by the WAP due to reasons of unfamiliarity of the said security algorithms while at the same time maintaining association relationships with associated MTs. Given the growing numbers of MTs and other devices in which WLAN capabilities are incorporated, there may be many security features implemented in such MTs and devices, all of which not being recognizable by all WAPs with which associations are sought. As such this embodiment allows a WAP to maintain associations with MTs and other devices even if some of the required processing are not possible at the said WAP. The embodiment is described using an uncommon security algorithm as example; however it is valid for any other type of processing that is uncommon between WAP and MT.

During an association of a MT with a WAP, a security algorithm that is knowledgeable to both entities is negotiated upon for securing transmissions over the wireless connection between the two entities. Traditionally, if the WAP is not knowledgeable of any of the security algorithms used by the MT, the MT cannot be associated with the said WAP. The here forth described embodiment of the present invention transcends this limitation and permits MTs to associate with a WAP even if the WAP is not knowledgeable of any of the security algorithms used by the MTs.

In this embodiment, a WAP controller 423 permits a MT 405 to associate with WAP 401 even though there are no common security algorithms that both WAP 401 and MT 405 are knowledgeable of. During the association phase, WAP controller 423 sends a solicitation message to other WAPs in the WLAN system 400 to determine which WAPs are knowledgeable of and agreeable to processing any of the security algorithms familiar to MT 405. If WAP 403 is knowledgeable of and agreeable to processing any of the security algorithms familiar to MT 405, WAP controller 425 responds to the solicitation message from WAP controller 423 with a chosen security algorithm. Upon receipt of the response to solicitation message, WAP controller 423 then establishes a tunnel connection 409 with WAP 403. WAP controller 423 next sends relevant security keys and context information to WAP 403 via the established tunnel connection 409. The chosen security algorithm is then intimated to MT 405 and it is associated with WAP 401.

Upon establishment of the tunnel connection 409 and exchange of security keys and context information, WAP controller 423 sends to WAP 403, MAC PDUs received from MT 405 associated with WAP 401, that have been encrypted based on the chosen security algorithm. WAP 403 receives the encrypted MAC PDUs via the tunnel connection and decrypts them based on chosen security algorithm and established security keys and context information. WAP controller 423 also sends to WAP 403, MAC PDUs that are to be encrypted before transmission to the associated MT 405. In this case, WAP 403 receives MAC PDUs via the tunnel connection 409, encrypts them based on chosen security algorithm and sends the encrypted MAC PDUs back to WAP 401. WAP 401 then transmits the encrypted MAC PDUs to the associated MT 405. In this embodiment, the lack of knowledge about a security algorithm does not limit a WAP from allowing a MT to associate with it. As such it provides greater flexibility in providing services to a great number of MTs with different processing requirements.

Figure 6:
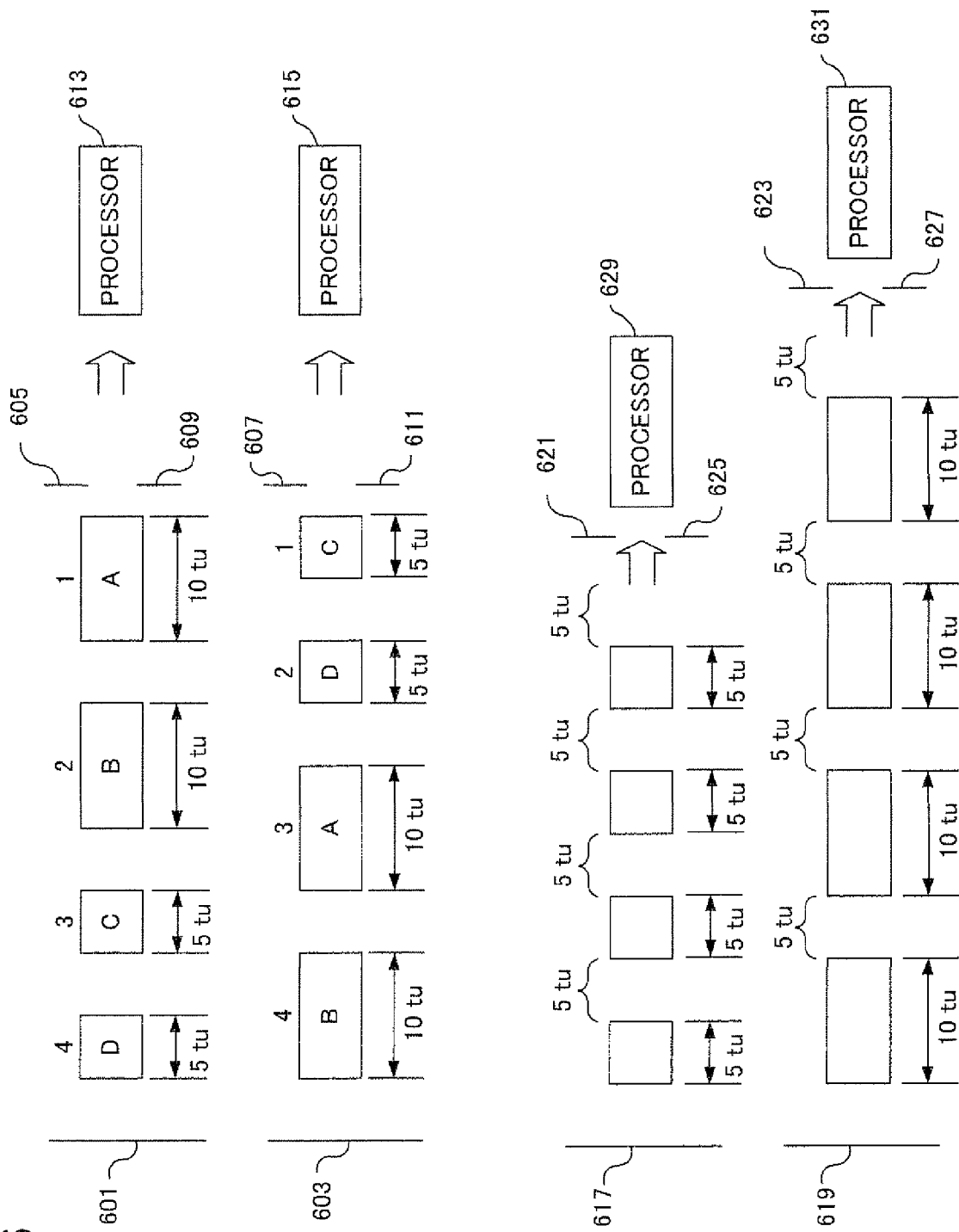
FIG. 6 is a diagram serving to explain the reasoning for one embodiment of a second aspect of the present invention, wherein the definition of processing load is taken to be the size of the protocol data unit (PDU) that is received by the WAP from associated MTs.

Another embodiment of the present invention relates to the size of PDUs processed by WAPs. Studies in processor scheduling have shown that processing large PDUs before small PDUs leads to greater average processing time as compared to cases where small PDUs are processed before large PDUs. FIG. 6 illustrates this through example. In a first case, it shows two processing schedules 601 and 603 for processors 613 and 615, respectively. The scheduling order 605 and 607 denote the relative order in which PDUs A, B, C and D are processed. 609 and 611 denote the processing time, in arbitrary time units (tu), required for processing each of the PDUs.

In schedule 601, large PDUs A and B are processed before small PDUs C and D. The average processing time for the PDUs is 21.25 tu, while it is only 16.25 tu for the PDUs in schedule 603 where small PDUs C and D are processed before large PDUs A and B. Clearly schedule 603, in which small PDUs are processed before large PDUs, leads to significant reductions in average processing time.

In a second case, the aspect of processing overhead for processor scheduling is considered. The processing of each PDU requires some processing overhead which includes memory access time and context transfer time. The overhead is generally independent of the size of the PDU as it is required before the actual processing. FIG. 6 depicts a schedule 617 for small PDUs alone in which processing overhead time and actual processing time is shown by 621 and 625, respectively. Processing overhead time 623 and processing time 627 is for large PDUs in schedule 619. From this, it is seen that the processing overhead takes up 50% of total time in a schedule 617 whereas overhead constitutes only 33⅓% in a schedule 619. This illustrates how processing only small PDUs can lead to a processor handling more overhead than when a processor handles large PDUs.

In an embodiment of the present invention related to the size of PDUs, the nASP processing load is defined as the size of PDUs handled by a WAP. A WAP controller 423 of WAP 401 monitors the size of PDUs received over a wireless connection 427 from an associated MT 405. When WAP controller 423 determines that WAP 401 is processing any of the previous described cases, the controller determines a processing schedule for a subset of the monitored received PDUs. The aim of the processing schedule is to optimize average processing time and processing overhead time at WAP 401.

Next, WAP controller 423 derives a resource characteristic for the PDUs that may be distributed to other agreeable WAPs for processing. As such, the resource characteristic represents the processing load required for processing PDUs other than those that are processed by the WAP 401 itself. The resource characteristic is then sent to other WAPs of the WLAN system 400 as part of a solicitation message to determine WAPs agreeable to processing the PDUs described in the message.

If WAP 403 is agreeable to the nASP processing of PDUs described in the solicitation message, WAP controller 425 responds accordingly. A WAP in the WLAN system will be agreeable to processing PDUs from another WAP when processing such PDUs would allow it to optimize its own average processing time and processing overhead time. Upon receipt of the response, WAP controller 423 then establishes a tunnel connection 409 with WAP 403 and sends relevant context information to WAP 403 via the established tunnel connection.

Having established the tunnel connection and exchanged relevant context information, WAP controller 423 sends to WAP 403, PDUs described by the previously sent resource characteristic with the aim of optimizing average processing time and processing overhead time at WAP 401. So with this embodiment, the nASP processing of PDUs of different sizes may be distributed in a manner so as to optimize processing while at the same time maintaining association relationships between WAPs and MTs.

In another embodiment, a WAP controller distributes the nASP processing load based on information comprising the size of the data unit to be processed, the expected average time for processing a data unit, the overhead time for processing a data unit and a weighted sum of said information.

Another embodiment of the disclosed method concerns the distribution of processing of ISO-OSI layer 3 and layers above layer 3 from a first WAP to other WAPs while maintaining association relations between the first WAP and MTs associated with it. Many WAPs are currently capable of processing up to ISO-OSI layer 2, however there are vendors manufacturing WAPs capable of ISO-OSI layer 3 processing. This embodiment refers to such devices and other similar WAPs. Processing for ISO-OSI layer 3 and layers above layer 3 includes quality of service (QoS) provisioning, routing and scheduling. In this embodiment, nASP processing load is defined as the processing concerning ISO-OSI layer 3 and layers above layer 3.

In this embodiment, a WAP controller 423 for WAP 401 derives a resource characteristic for the processing of ISO-OSI layer 3 and layers above 3 based on the factors of nASP processing load monitored for each of the communication sessions between WAP 401 and associated MT 405. The resource characteristics of all communication sessions are then combined to derive an aggregate nASP load factor for WAP 401 which is then compared to a nASP load threshold to determine impending nASP processing overload conditions.

If impending nASP processing overload conditions are determined, WAP controller 423 then determines parts of nASP processing load of ISO-OSI layer 3 and layers above 3 that may be distributed to other WAPs in the WLAN system with the aim of reducing overall processing load at WAP 401. Next, WAP controller 423 sends a solicitation message, comprising resource characteristics of the determined parts of nASP processing load of ISO-OSI layer 3 and layers above 3, to determine which other WAPs are agreeable to receiving and performing processing of the parts of nASP processing load on behalf of WAP 401.

If WAP 403 is agreeable to processing the parts of nASP processing load based on the solicitation message, WAP controller 423 sends a positive response to WAP 401. Upon receiving the response, WAP controller 423 establishes a tunnel connection 409 between WAP 401 and WAP 403 after which relevant context information required for processing of parts of nASP processing load of ISO-OSI layer 3 and layers above 3 is transmitted over tunnel connection to WAP 403. Then WAP controller 423 sends the determined parts of nASP processing load to WAP 403 with the aim of reducing nASP processing load at WAP 401 by distributing parts of processing load to other WAPs while maintaining existing association relations between WAPs and MTs.

In yet another embodiment of the aspect of the present invention dealing with negotiations for accommodating dynamic differences among WLAN entities, a central controller entity takes part in the negotiations. Broadly, the central controller entity coordinates how the dynamic differences are to be managed among participating WLAN entities. One particular embodiment involves the central controller coordinating the distribution of nASP processing load across the WAPs under its purview.

Figure 7:
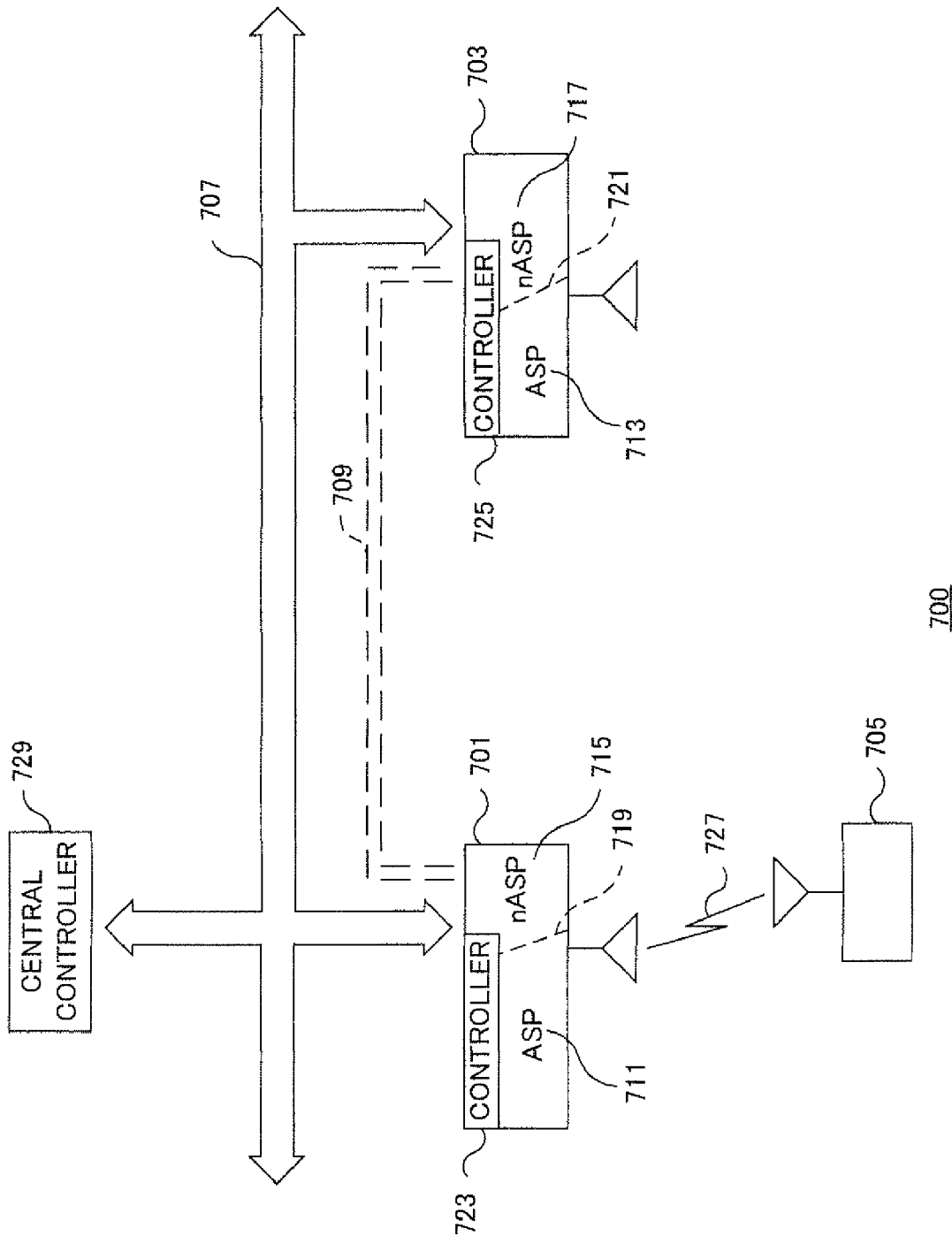
FIG. 7 is a diagram illustrating one embodiment of a second aspect of the present invention in which a central controller performs a supervisory role in the negotiations for accommodating dynamic differences among WLAN entities.

This is described with reference to FIG. 7 which illustrates a central controller 729 that is capable of monitoring the nASP processing loads at WAPs 701 and 703. When the nASP processing load at WAP 701 exceeds a nASP processing load threshold, the central controller sends a solicitation message to other WAPs in the WLAN system requesting assistance for the processing of parts of processing load of WAP 701. This begins the negotiations phase between the central controller 729 and other WAPs in the WLAN system 700. The solicitation message includes descriptors of the parts of processing load at WAP 701 to be distributed to other WAPs with the aim of reducing overall processing load at WAP 701.

If WAP 703 is agreeable to assist with the processing for WAP 701, a WAP controller 725 responds to the solicitation message. The central controller 729 then intimates WAP 701 about the acceptance, after which WAP 701 establishes a tunnel connection 709 with WAP 703. It then sends WAP 703 relevant context information followed by the parts of processing load as specified in the solicitation message. Alternatively, WAP 701 may send the context information and parts of processing load to the central controller 729 which then forwards this to the agreeable WAPs like WAP 703. So with this embodiment, processing load is distributed across WAPs of a WLAN with a central controller coordinating the distribution.

In another embodiment, the central controller receives regular information from WAP controllers of the WAPs under its purview regarding their nASP processing loads. As such, the WAP controllers themselves determine overload conditions and the necessity to distribute parts or all of nASP processing load to other WAPs or other WLAN entities. The negotiations phase in this embodiment is thus initiated by the WAP controllers and then further pursued between the central controller and other WAPs.

The embodiments presented so far exhibit how negotiations between various WLAN entities based on the disclosed policies which may be used to accommodate the dynamic differences among them. In particular, they describe how processing load may be classified as being association-specific and non-association-specific. They also illustrate how parts of nASP processing load may be distributed to other WAPs of the WLAN system for the purpose of reducing overall processing load at a first WAP. The disclosed invention is unique in that it permits the distribution of processing load while maintaining existing association relationships between WAPs and MTs. As such, the disclosed method for accommodating dynamic differences does not necessitate in the physical displacement of any WLAN entity which is unlike existing methods. This innovation is therefore more flexible than handover-based methods for distributing processing load. It also transcends the limitations of such schemes.

The various aspects of the disclosure presented insofar illustrate the novelty of the method for negotiations in accommodating static and dynamic differences among WLAN entities. Whereas, extant methods focus on hard divisions in functionality among WLAN entities, the present invention presents alternate means where functionality divisions may be made in flexible manners. Also, while existing methods require re-associations and the consequent geographical and physical limitations of handovers, this innovation puts forth ways of dealing with imbalances in processing load without the constraints of handover-based methods.

It will be clear to anyone skilled in the related art that the disclosed invention may take the form of numerous other embodiments with numerous other policies for the negotiations and handling of differences among WLAN entities without deviating from the essence and scope of this disclosure. As such the present invention will be applicable in all such embodiments and practices.

Industrial Applicability

The present invention has the advantage of accommodating differences among WLAN entities. The present invention, thus, can be applied to the technical field of wireless local area networks and in particular to the technical field of a wireless local area network in heterogeneous environments.

The invention claimed is:

1. A wireless point that provides for functions for a wireless local area network to be separated between said wireless point and one or more control nodes, said wireless point comprising:
    a discovery unit configured to send a discovery request message to said one or more control nodes;
    a selecting unit configured to select one control node of said one or more control nodes based on one or more discovery response messages sent to said wireless point from said one or more control nodes in response to said discovery request message, each of said one or more discovery response messages including information of functions offered by the associated control node of said one or more control nodes;
    a session establishing unit configured to establish a secure session with said selected one control node; and
    a negotiation unit configured to exchange information about the functions to be separated between said selected one control node and said wireless point.

2. The wireless point according to claim 1, wherein said information exchange is performed by transmitting, to the selected one control node, information about functions that said wireless point has, and receiving, from said selected one control node, information about functions that said selected one control node has.

3. The wireless point according to claim 1, wherein said functions for the wireless local area network comprise at least one of Beacon Signal Control, Power Management, Quality of Service (QoS), Scheduling, Authentication, and Encryption/Decryption.

4. A method for providing service in a wireless local area network that provides for functions for said wireless local area network to be separated between a wireless point and one or more control nodes, said method comprising:
    sending a discovery request message to said one or more control nodes;
    selecting a control node of said one or more control nodes based on one or more discovery response messages sent to said wireless point from said one or more control nodes in response to said discovery request message, each of said one or more discovery response messages including information of functions offered by the associated control node of said one or more control nodes;
    establishing a secure session with said selected one control node; and
    exchanging information about the functions to be separated between said selected one control node and said wireless point.

5. The method according to claim 4, wherein said information exchange is performed by transmitting, to the selected one control node, information about functions that said wireless point has, and receiving, from said selected one control node, information about functions that said selected one control node has.

6. The method according to claim 4, wherein said functions for the wireless local area network comprise at least one of Beacon Signal Control, Power Management, Quality of Service (QoS), Scheduling, Authentication, and Encryption/Decryption.

* * * * *

UNITED STATES PATENT AND TRADEMARK OFFICE
CERTIFICATE OF CORRECTION

PATENT NO. : 8,270,384 B2  
APPLICATION NO. : 13/235912  
DATED : September 18, 2012  
INVENTOR(S) : Hong Cheng, Pek Yew Tan and Saravanan Govindan Page 1 of 1

It is certified that error appears in the above-identified patent and that said Letters Patent is hereby corrected as shown below:

Title Page:

Item (56), References Cited, Other Publications, Should include a reference of "PCT International Search Report dated May 17, 2005."

Signed and Sealed this  
Sixteenth Day of July, 2013

Teresa Stanek Rea  
*Acting Director of the United States Patent and Trademark Office*